(12) United States Patent
Heimer

(10) Patent No.: US 6,794,081 B2
(45) Date of Patent: Sep. 21, 2004

(54) SELECTABLE CAPACITY FIXED FOOTPRINT LEAD-ACID BATTERY RACKING SYSTEM WITH HORIZONTAL PLATES

(75) Inventor: Drew Heimer, Lansdale, PA (US)

(73) Assignee: C&D Charter Holdings, Inc., Wilmington, DE (US)

( * ) Notice: Subject to any disclaimer, the term of this patent is extended or adjusted under 35 U.S.C. 154(b) by 0 days.

(21) Appl. No.: 10/219,839

(22) Filed: Aug. 15, 2002

(65) Prior Publication Data

US 2002/0192543 A1 Dec. 19, 2002

Related U.S. Application Data

(62) Division of application No. 09/441,402, filed on Nov. 16, 1999, now Pat. No. 6,475,659.
(60) Provisional application No. 60/108,766, filed on Nov. 17, 1998.

(51) Int. Cl.[7] .................................................. H01M 2/20
(52) U.S. Cl. ....................... 429/121; 429/123; 429/160; 429/161
(58) Field of Search ................................ 428/158–161; 429/121, 123, 87, 179; 439/522, 718, 627

(56) References Cited

U.S. PATENT DOCUMENTS

| | | | |
|---|---|---|---|
| 2,481,558 A | * | 9/1949 | Appel .......................... 429/161 |
| 5,053,296 A | | 10/1991 | Stocchiero |
| 5,441,123 A | | 8/1995 | Beckley |
| 5,593,796 A | | 1/1997 | Misra et al. |
| 5,663,008 A | | 9/1997 | Shimakawa et al. |
| 5,981,101 A | | 11/1999 | Stone |
| 6,294,282 B1 | | 9/2001 | Misra et al. |
| 6,312,852 B1 | | 11/2001 | Wagner |

* cited by examiner

Primary Examiner—Susy Tsang-Foster
(74) Attorney, Agent, or Firm—Hoffmann & Baron, LLP

(57) ABSTRACT

A battery system having lead-acid cells, vertically upstanding cell support frame for supporting the cells, vertically upstanding members with receptacle means for slidably receiving and retaining vertical cell supports, and manually assemble means for connectively maintaining and spacing the upstanding members for receipt of the cell supports. The cells have horizontal positive and negative sandwiched lead-metal plates contained within a cell case resting on the vertical supports. The case has an expandable region surrounding the terminal for relieving pressure on that terminal from grid expansion while simultaneously maintaining the integrity of the case seal to the terminal. The cell support frame includes an elongated strap external of the case for connecting together terminals of the cell and having an output terminal and a central portion on the strap for electric communication with another battery.

8 Claims, 24 Drawing Sheets

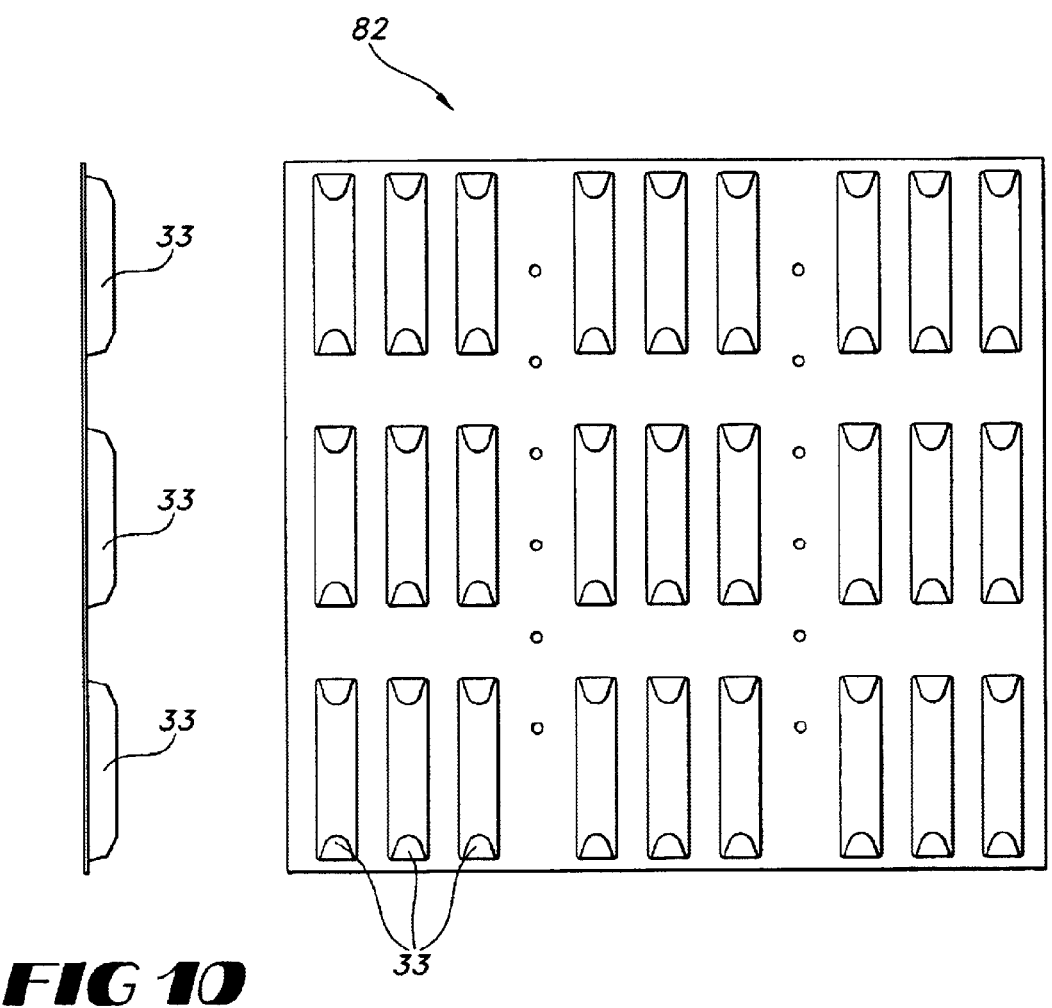
FIG 10  FIG 8
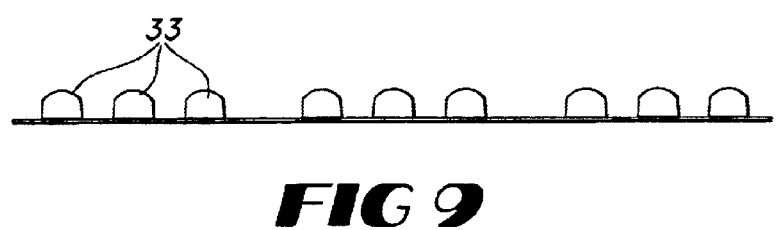
FIG 9

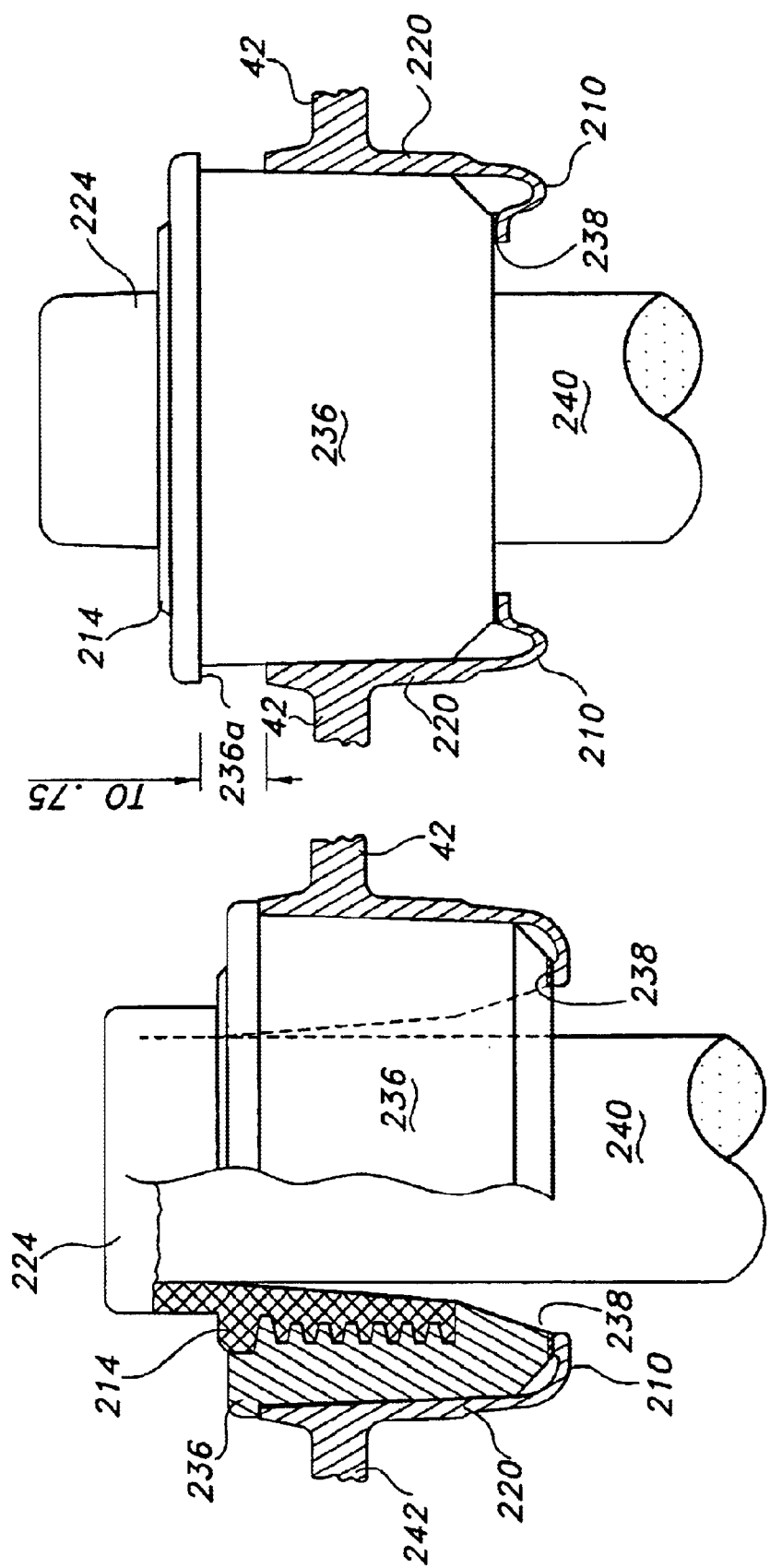

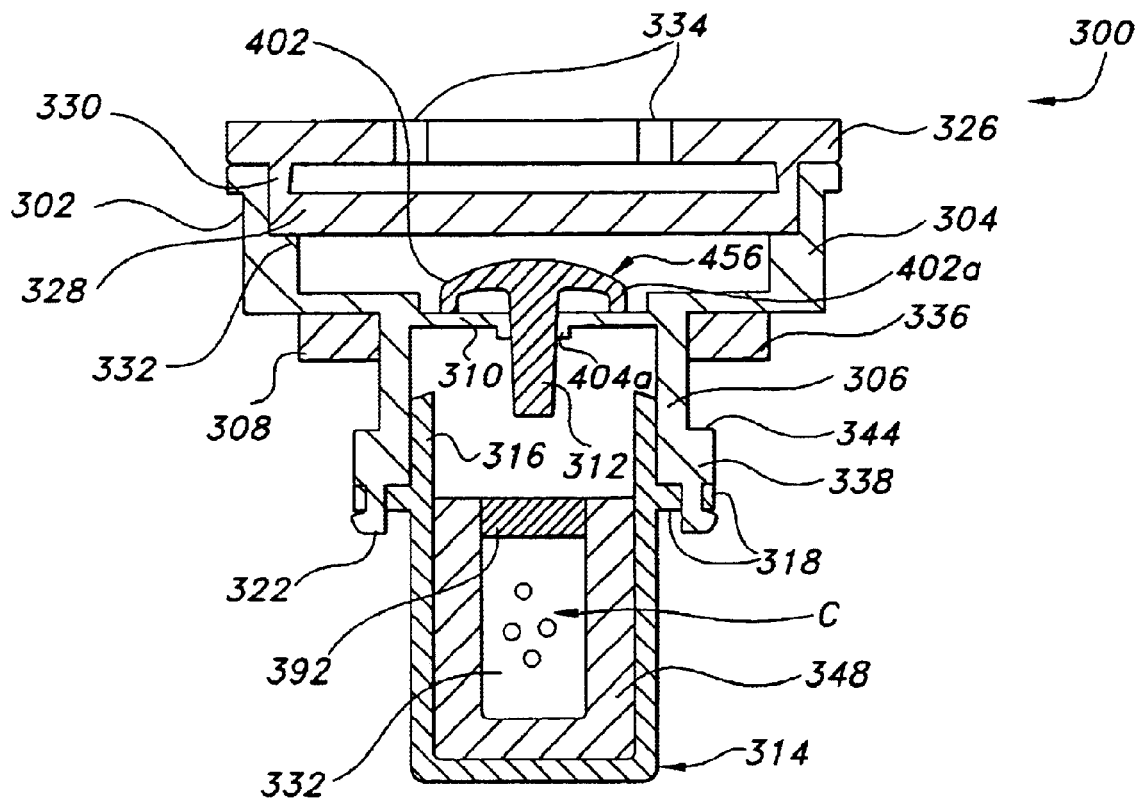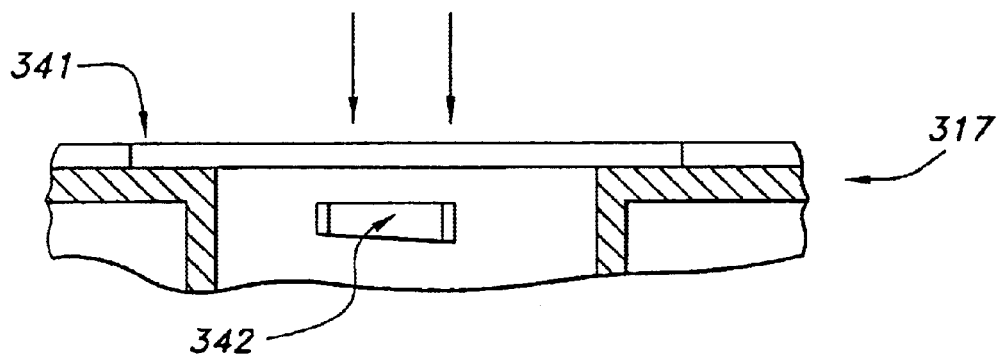
FIG 24

SELECTABLE CAPACITY FIXED FOOTPRINT LEAD-ACID BATTERY RACKING SYSTEM WITH HORIZONTAL PLATES

CROSS-REFERENCE TO RELATED APPLICATION

This application claims the benefit of U.S. Provisional Application No. 60/108,766 filed on Nov. 17, 1998 and is a divisional of U.S. Ser. No. 09/441,402 filed on Nov. 16, 1999, now U.S. Pat. No. 6,475,659 B1.

FIELD OF THE INVENTION

This invention relates to lead acid cells.

BACKGROUND OF THE INVENTION

The problem of supporting banks of cells, particularly those that are used primarily for standby applications, has been the subject of much study.

Some of this effort has been devoted to designing racks specifically for cells, with some attention being paid to spacers and connections, as well as to needs of ventilation.

SUMMARY OF THE INVENTION

In one of its aspects, this invention provides a battery system including a plurality of lead-acid cells where the system includes a vertically upstanding cell support frame having a plurality of means for individually vertically supporting at least one of the lead-acid cells, at least two vertically upstanding members having receptacle means formed therein for jointly slidably receiving and retaining a plurality of the cell vertical support means and manually assemble means for connectively maintaining the upstanding members in spaced positional relationship one to another for receipt of the cell support means. Each of the cells preferably has a plurality of horizontal positive and negative sandwiched lead metal plates contained within a cell case resting on the vertical support means. The battery system further preferably includes means occupying vertical space between an upper surface of the cell case and a vertically immediately adjacent one of the cell support means for deformably resisting vertical expansion of the cell case, due principally to plate growth as the battery system operates.

In another of its aspects, this invention provides a battery system including a plurality of lead-acid cells where the system includes an upstanding cell support frame comprising means for supporting the lead-acid cells, with each of the cells having a plurality of horizontal positive and negative sandwiched lead metal plates contained within a cell case resting on the support means, together with means occupying the vertical space between an upper surface of the cell case and a vertically immediately adjacent one of the cell support means for deformably resisting vertical expansion of the cell case due to plate growth as the battery system operates.

In yet another one of its aspects this invention provides a battery having a plurality of lead-acid cells where each of the cells has a plurality of individual positive and negative sandwiched lead metal plates contained within a cell case and at least one of the cells includes an elongated strap external of the cell case for connecting together terminals of the cell of like polarity and having an output terminal and a central portion on the strap for electric communication with at least one other battery and/or a load.

In yet another of its aspects, this invention provides a battery system having a plurality of lead-acid cells where the system includes an upstanding cell support frame including means for individually upwardly supporting at least one of the lead acid cells, where each of the cells has a plurality of horizontal positive and negative sandwiched lead metal plates contained within a cell case resting on the cell support means, with at least one of the cells having a thermoplastic case including an exterior wall having an aperture therethrough for passage of a positive terminal therethrough, a generally cylindrical sleeve within the aperture formed integrally with the case and the exterior wall for receiving the positive terminal, and a flexible loop of thermoplastic material connecting the wall with a cylindrical sleeve along the respective peripheries thereof, with the loop being integral with the sleeve continuously about the periphery thereof and connecting the bottom portion to the exterior wall continuously about the periphery thereof and being sufficiently flexible to deform and permit axial movement of the terminal within the sleeve upon plate expansion during operation of the cell.

In yet another of its aspects, this invention provides a battery system including a plurality of lead-acid cells. The system includes a vertically upstanding cell support frame including means for individually vertically supporting at least adjoining ones of the lead-acid cells and maintaining vertical apertures therebetween for convective cooling air flow therethrough, with each of the cells having a plurality of horizontal positive and negative sandwiched lead metal plates contained within a cell, with means occupying vertical space between an upper surface of the cell case and a vertically immediately adjacent one of the cell vertical support means deformably resisting vertical expansion of the cell case to due to plate growth as the battery system operates. The deformable means has apertures therethrough, above the apertures in the cell vertical support means, for convective cooling air flow therethrough. The means between the adjoining cells has upwardly directed channels therethrough positioned for fluid communication with the apertures of the cell support means and the apertures in the deformable vertical expansion resistant means thereby serving to maintain the adjoining cells in laterally spaced relationship while upwardly channeling convective cooling air flow therebetween.

An aspect of the invention is provision of connectors for connecting together terminals of like polarity by providing snug fitting hole in a conductive bar spaced to snugly fit over and engage in good electrical contact terminals of like polarity. A terminal at a fixed central position on the bar is adapted to receive a terminal connector. This reduces the quantity of customer corrections in half.

This invention provides an expandable region of the thermoplastic case surrounding a terminal for relieving pressure on that terminal due to grid expansion while simultaneously maintaining of the integrity of the case seal to the terminal. The expandable seal includes a cell cover having an opening therethrough for passage of a terminal bushing for supporting plates of one polarity. A tubular thermoplastic sleeve formed integrally with the cell cover extends into the opening between the cover and the bushing. Airtight flexible thermoplastic connector means connects the sleeve to the case or the bushing. The flexible connector means is an annular flexible thermoplastic connector integral with the sleeve, extending entirely around the sleeve and sufficiently thinner than the cell cover to afford more flexibility than the cell cover.

The expandable terminal and case section minimizes, if not eliminates, risk of fracture as the positive grids expand and the case changes shape somewhat due to pressure built up or reduced due to partial vacuum within the cell.

BRIEF DESCRIPTION OF THE DRAWINGS

FIG. 8 is a top view of the vertical spacer illustrated in FIG. 6.

FIG. 9 is a front view of the vertical spacer illustrated in FIG. 8.

FIG. 10 is a side view of the vertical spacer illustrated in FIG. 8.

FIG. 21a is yet another embodiment of flexible terminal-case structure similar to that illustrated in FIGS. 18 and 20.

FIG. 21b is a view of the structure illustrated in FIG. 21a but with only the cell jar being sectioned, illustrating the manner in which the cell terminal can move if needed during battery operation.

FIG. 24 is an enlarged sectional view, taken along line C—C of FIG. 22, together with a partial sectional view of a vent valve-catalyst carrier assembly of a case.

DESCRIPTION OF THE PREFERRED EMBODIMENTS AND BEST MODE KNOWN FOR PRACTICE OF THE INVENTION

Figure 1:
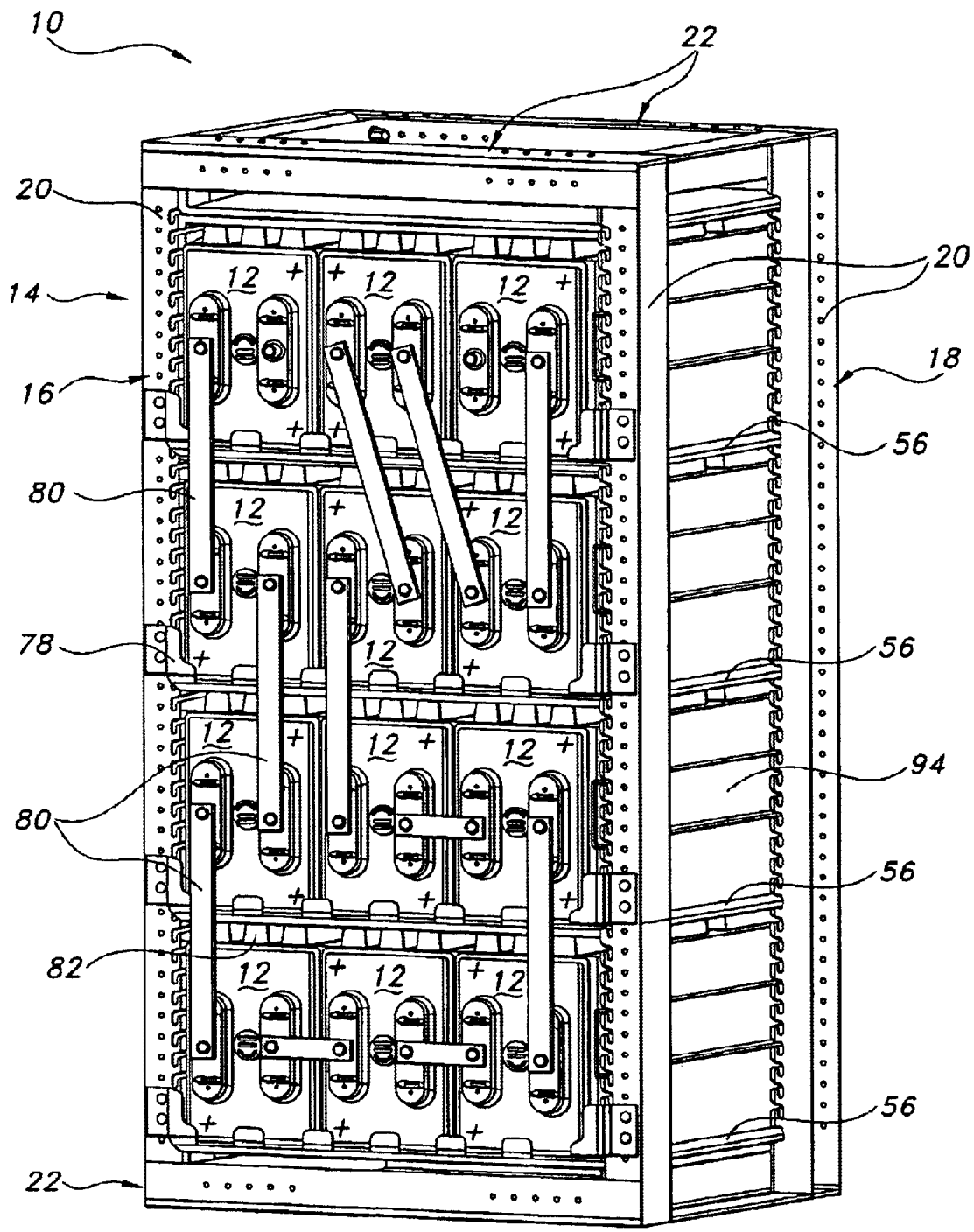
FIG. 1 is an isometric view of a preferred embodiment of the battery system according to the invention.
Figure 2:
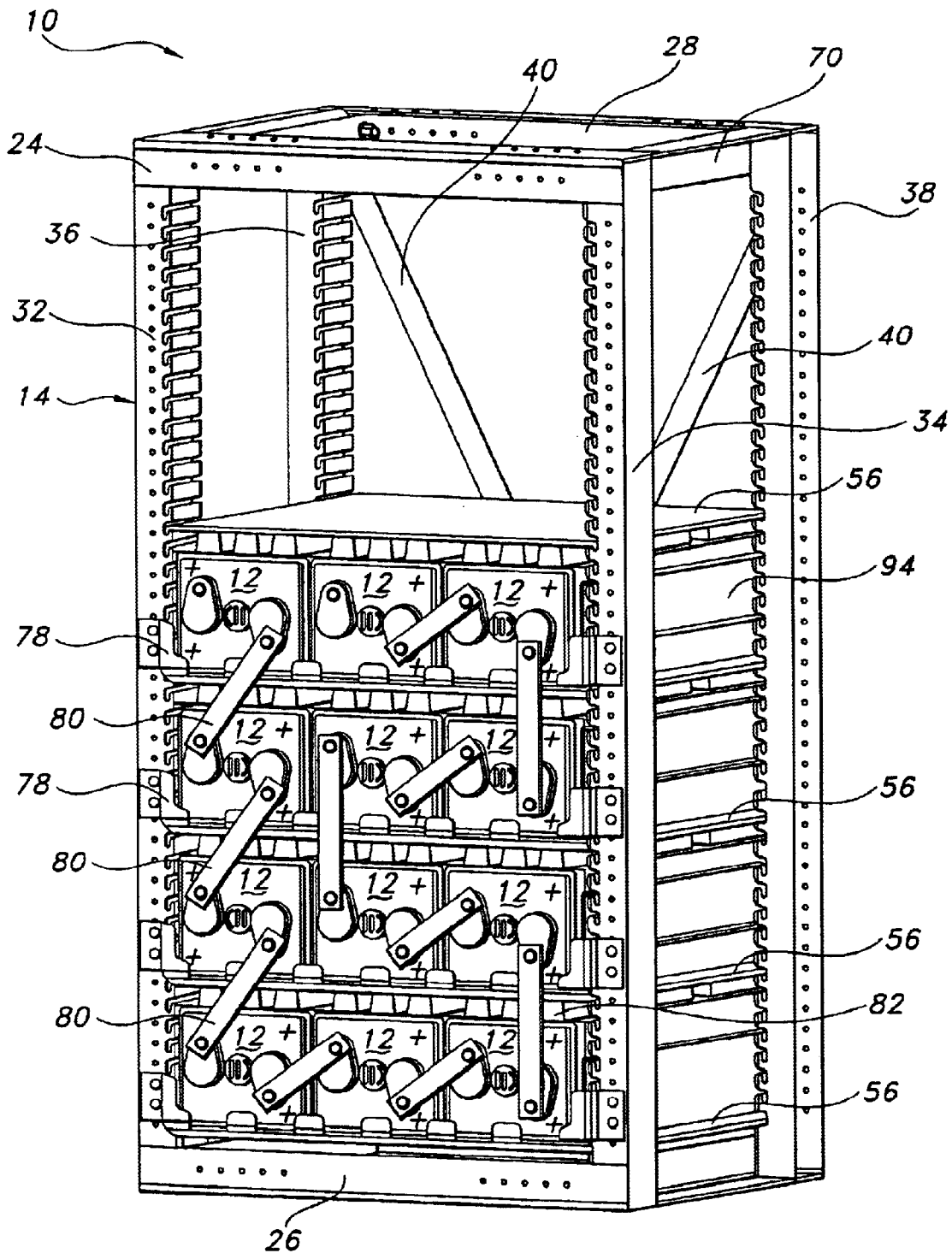
FIG. 2 is an isometric view of a battery system according to the invention, which is similar to the system shown as FIG. 1, with shelves in different positions to accommodate smaller batteries.

Referring now to the drawings, and particularly FIGS. 1 and 2, there is shown a battery system designated generally 10 including an assembled battery rack generally designated 14. FIGS. 1 and 2 show the rack 14 arranged with cell support shelves 56 in different positions.

Rack 14 includes a rack front frame designated generally 16 and a rack rear frame designated generally 18, both of which are illustrated in the upstanding position in FIGS. 1 and 2. Rack front frame 16 and rack rear frame 18 include two upstanding members which are designated generally 20 and two horizontal members, which are designated generally 22 in the drawings. Rack front frame 16 specifically includes upper and lower front horizontal members designated 24, 26 in the drawings and left and right front upstanding members designated 32, 34 in the drawings. Similarly, rear rack frame 18 includes upper rear horizontal members 28 and a lower rear horizontal member, not shown, and left and right rear upstanding members 36, 38. Additionally, rack rear frame 18 includes two rear cross braces designated generally 40 in the drawings; these cross braces run diagonally between the respective corners as illustrated in FIG. 2.

Figure 7:
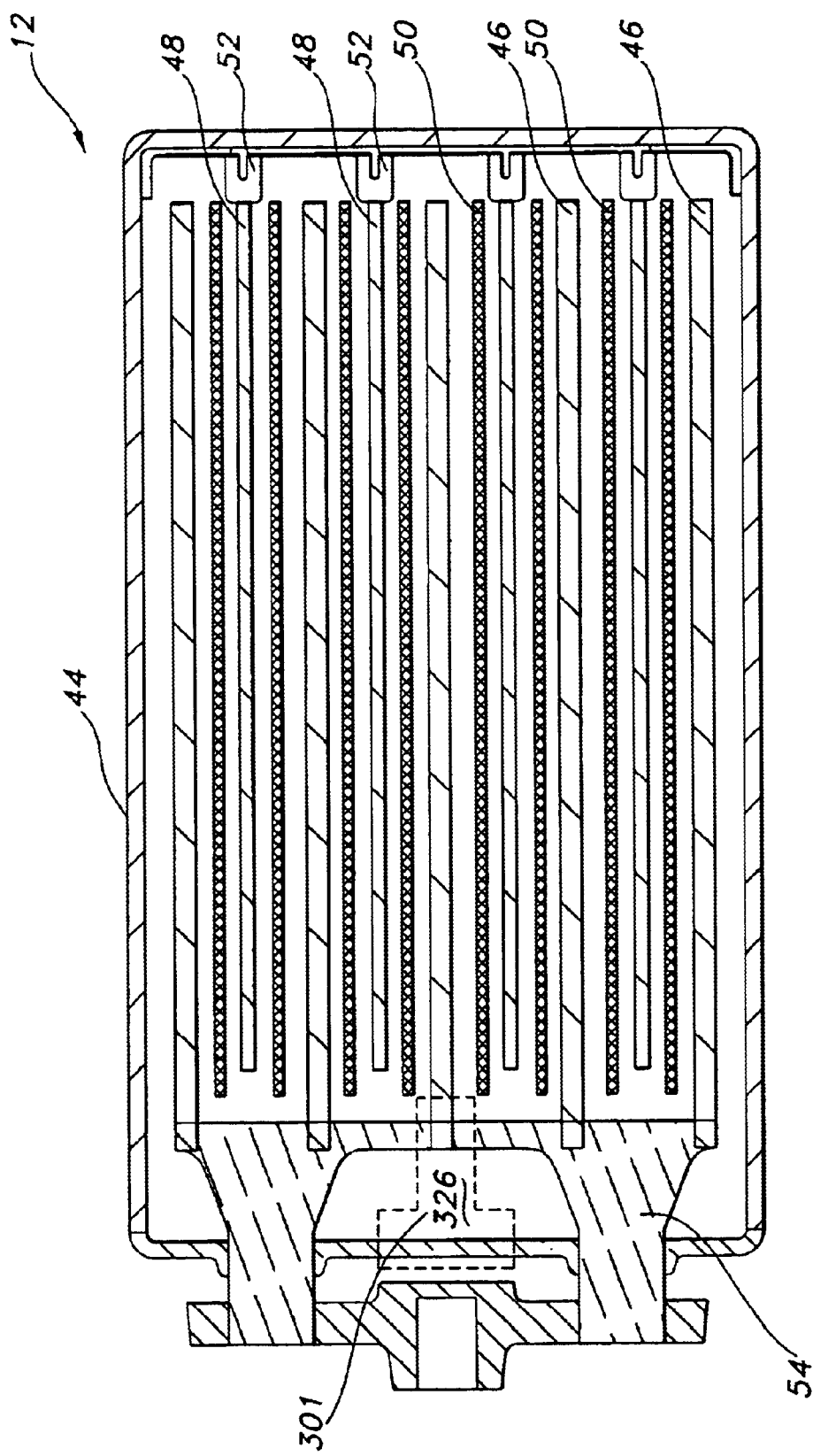
FIG. 7 is a vertical section in schematic form of a single cell used in a battery system according to the invention as illustrated in FIG. 1.

In FIGS. 1 and 2 the cells 12 are positioned in the rack 14, with cell plates 46, 48, as seen in FIG. 7, parallel to shelf 56 and interconnected.

Figure 3:
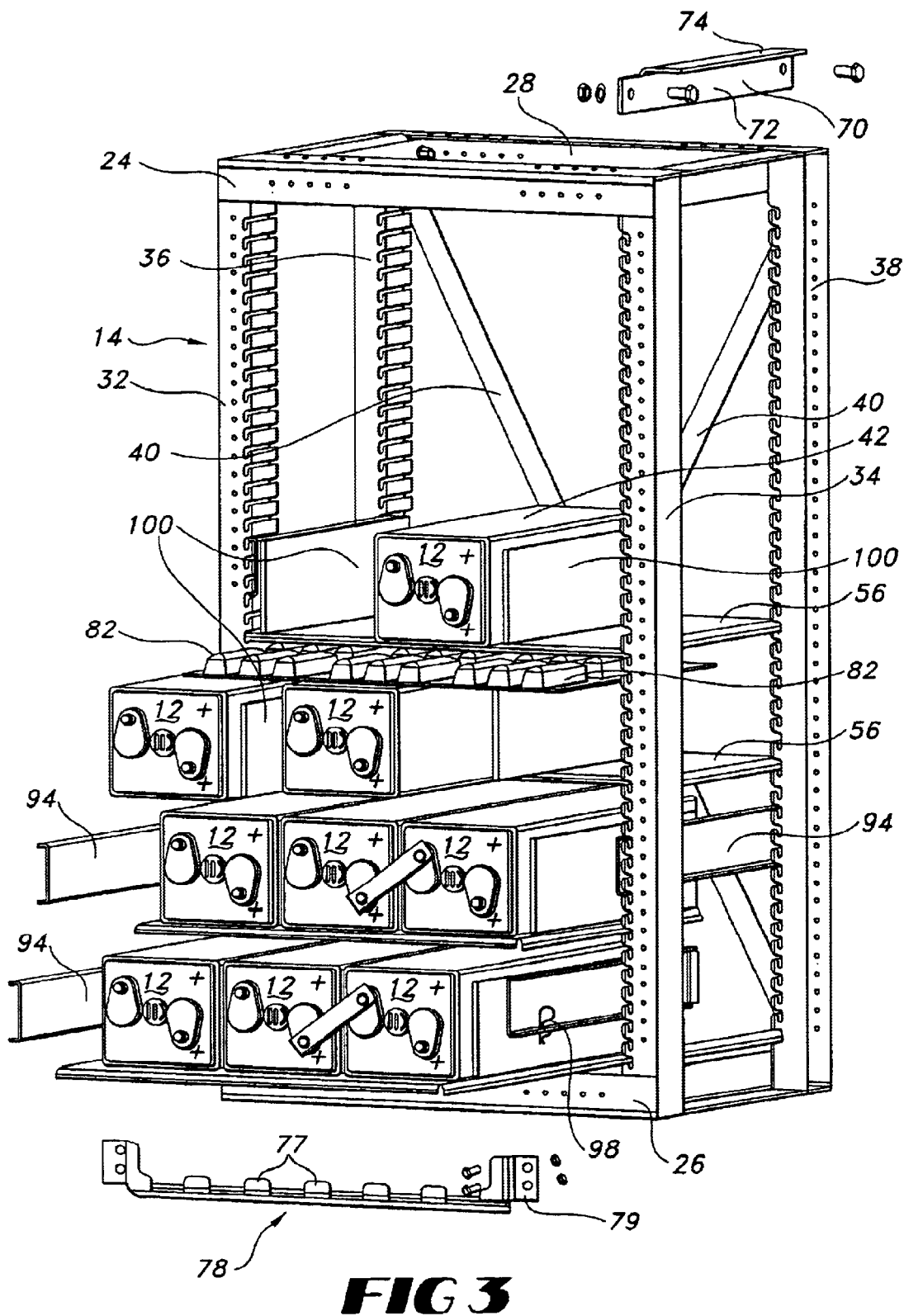
FIG. 3 is a view of the battery system illustrated in FIG. 2 with the battery system partially disassembled and showing the pieces which make up the rack, including vertical and horizontal spacers.

Each cell 12 includes a cell cover designated generally 42 and a cell jar designated generally 44, as shown in FIGS. 3 and 7. Within each cell are a plurality of cell position plates, each of which is designated generally 46 and is illustrated in FIG. 7 and a plurality of cell negative plates 48, which are also illustrated in FIG. 7. Cell positive and negative plates 46, 48 are disposed in horizontal planes and separated by cell plate separators 50 which are preferably glass mat. Negative plates 48 are preferably vertically supported by negative plate supports 52 depicted at the right in FIG. 7. Negative plate supports 52 may be formed as a part of a separate piece which is inserted into cell jar 44 and adhered thereto preferably by cement with the resulting structure being as depicted generally in FIG. 7; alternatively, negative plate supports 52 may be molded in place integrally as a part of cell jar 44.

Each cell 12 further preferably includes a lead metal positive plate header designated generally 54 in FIG. 7; the positive plate header serves to electrically interconnect all of the positive plates of a given cell 12.

Figure 13:
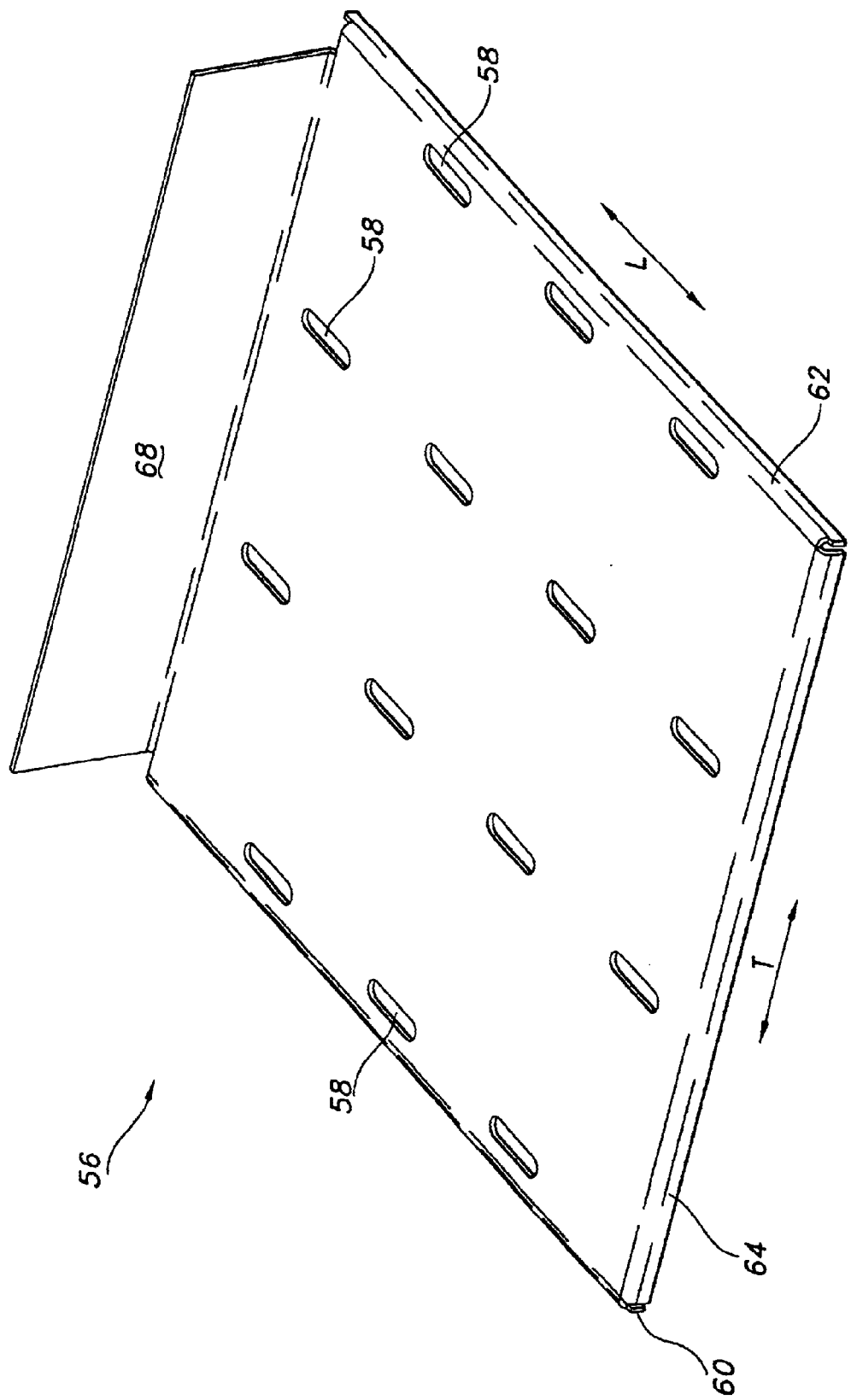
FIG. 13 is an isometric view of a cell support shelf forming a portion of a rack constituting a portion of the system illustrated in FIGS. 1 and 2.
Figure 15:
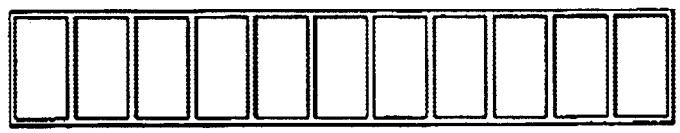
FIG. 15 is a top view of the horizontal spacer illustrated in FIG. 14.
Figure 14:
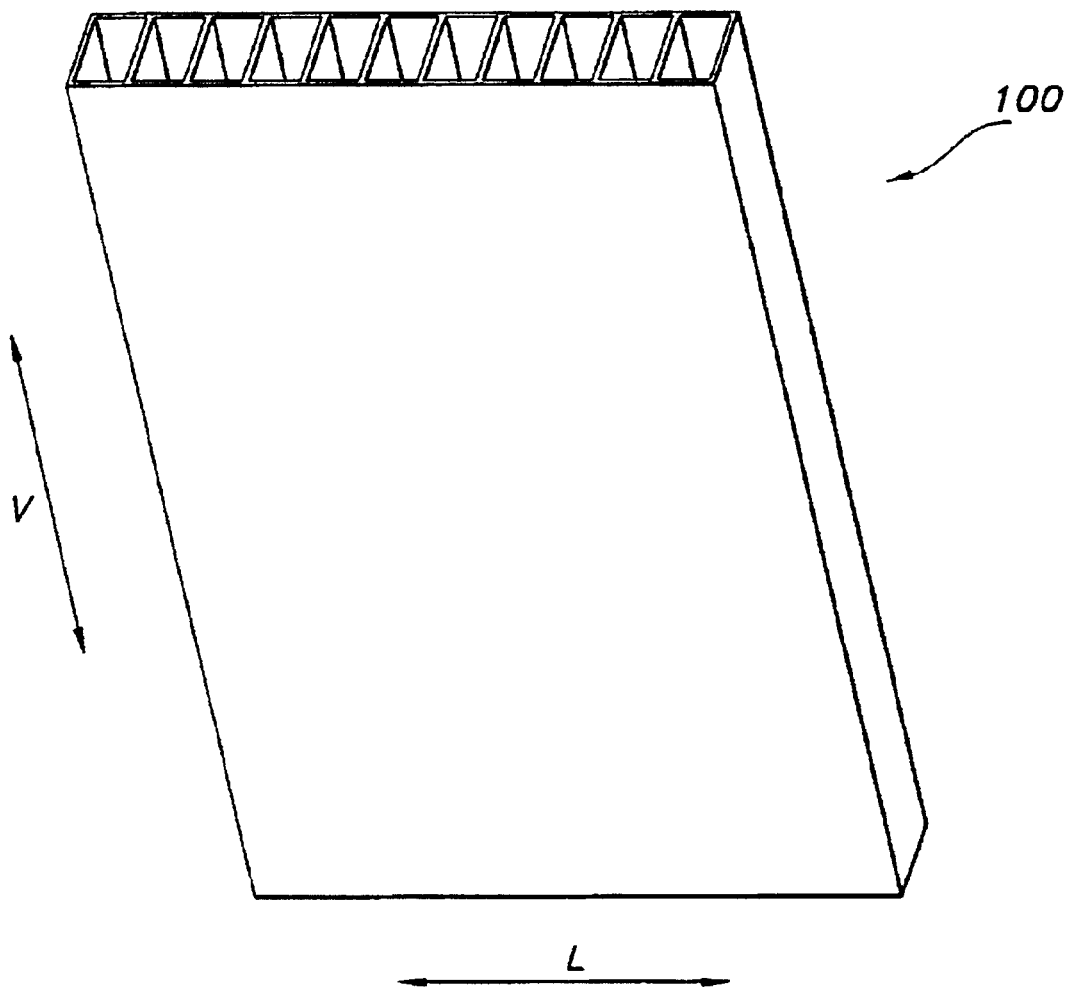
FIG. 14 is an isometric view of a horizontal spacer used with a system as illustrated in FIGS. 1 and 2.
Figure 16:
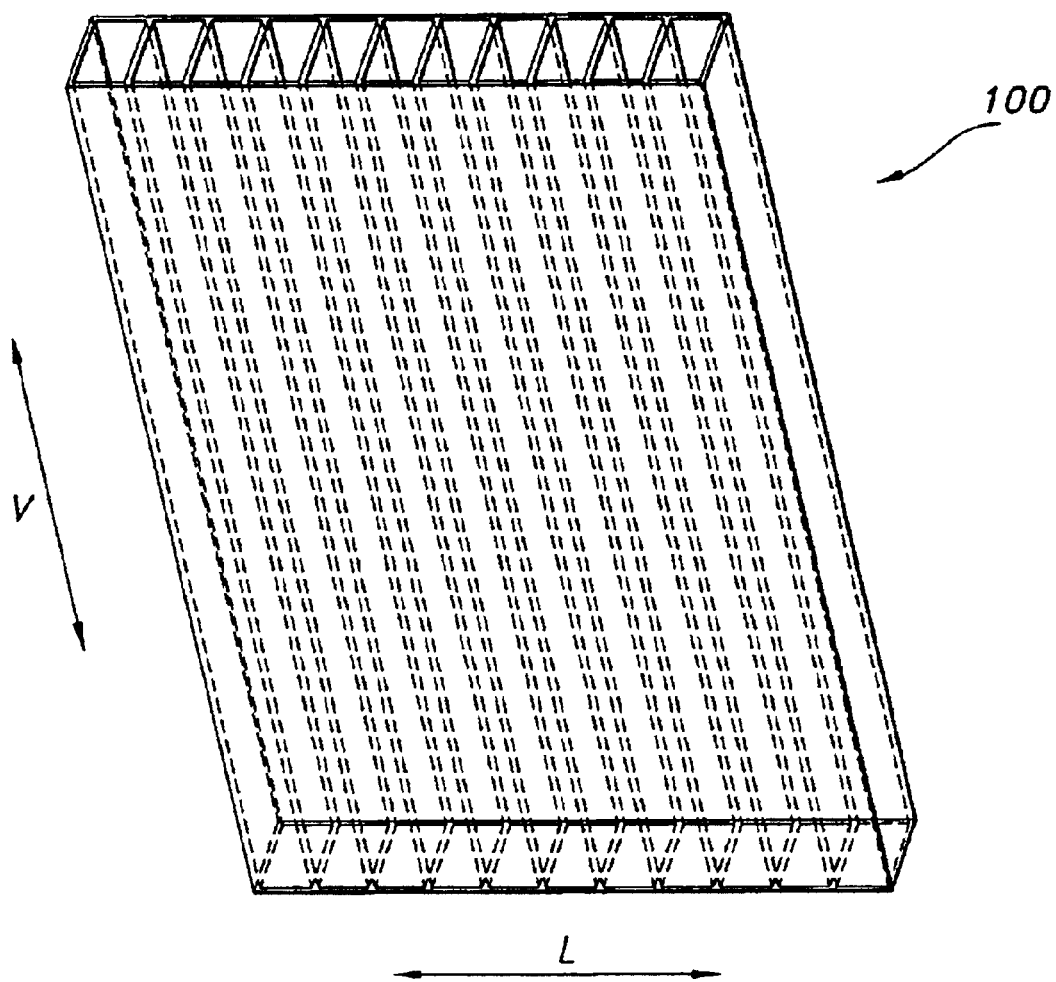
FIG. 16 is an isometric view of the spacer similar to FIG. 14 but showing the internal partitions of the spacer in dotted lines.
Figure 17:
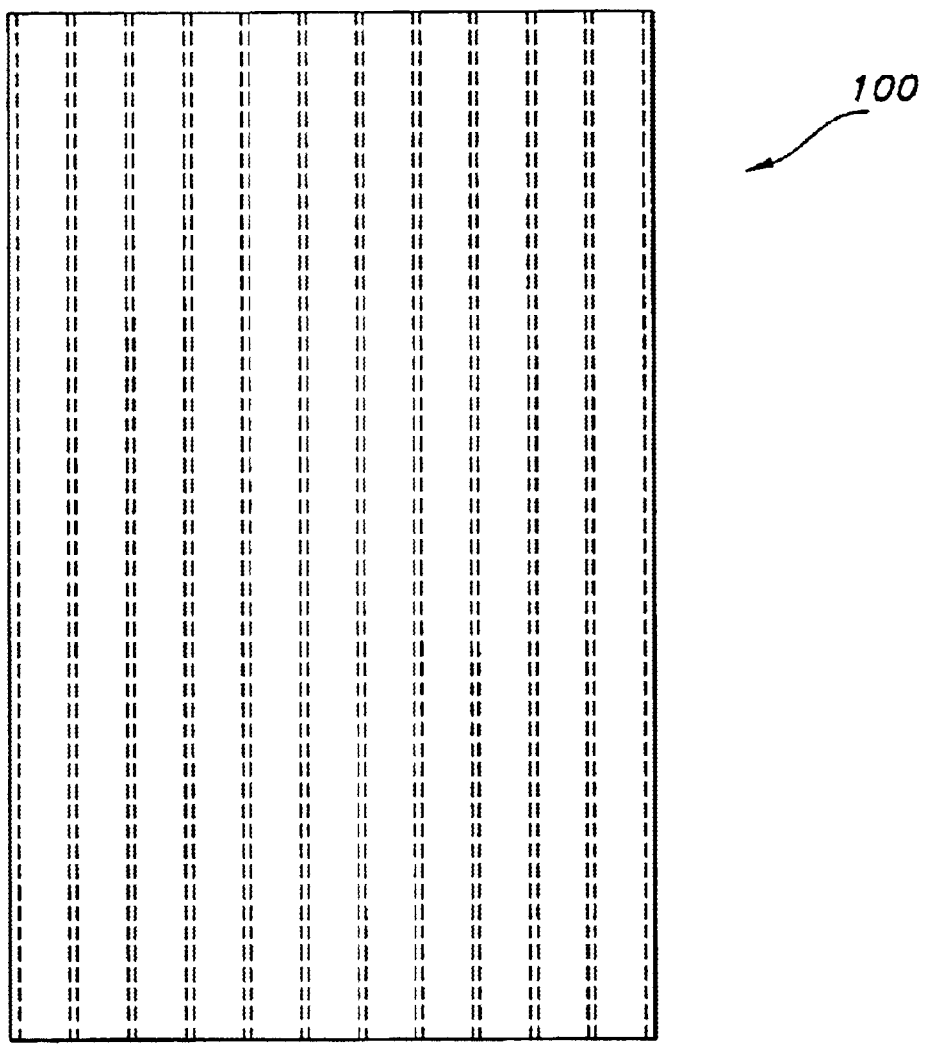
FIG. 17 is a side elevation of the spacer illustrated in FIGS. 14 through 16.

Cells 12 preferably rest on cell support shelves 56 which are a part of rack 14. A single one of cell support shelves 56 is illustrated in FIG. 13 and preferably includes a plurality of apertures 58. Apertures 58 are preferably aligned along lines running from the front to the rear of rack 14 and battery system 10. Apertures 58 are preferably laterally spaced one from another and positioned in rows running from front to rear in order to provide cooling channels between horizontally adjacent and immediately neighboring cells 12 which are supported by cell support shelf 56.

Cell support shelf 56 further includes longitudinally extending lips 60, 62 where the longitudinal direction is as indicated by arrow L in FIG. 13 and the transverse direction is indicated by arrow T; the vertical direction is the vertical as indicated in FIG. 1. Longitudinally extending lips 60, 62 are specially shaped to fit within similar, complementally shaped slots formed in upstanding members 20 as best illustrated in FIGS. 1, 2, 3, 4, 11 and 12.

Figure 11:
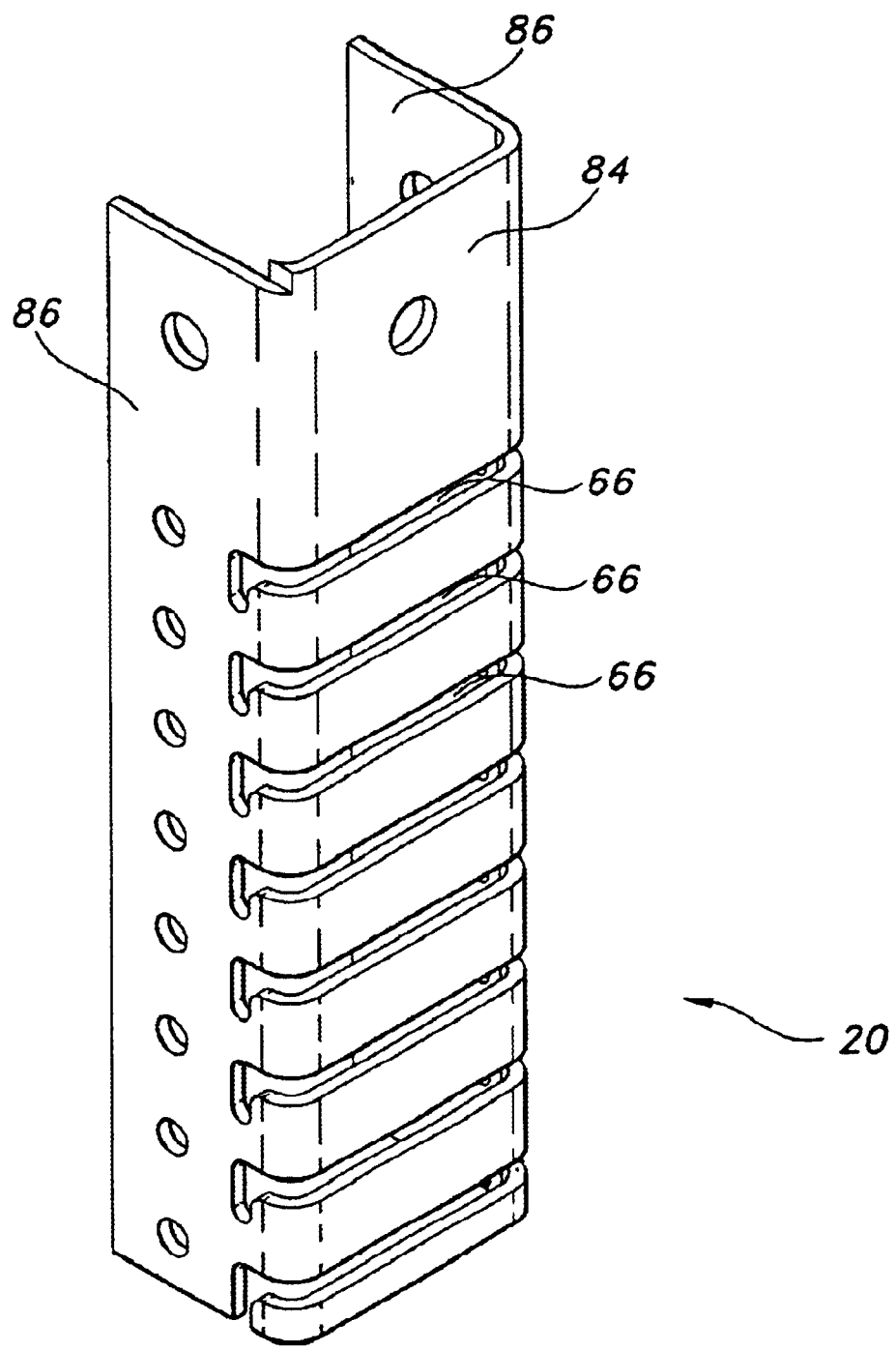
FIG. 11 is an isometric view of an upstanding channel member, two of which are included in each of the front and rear frames of the rack.
Figure 12:
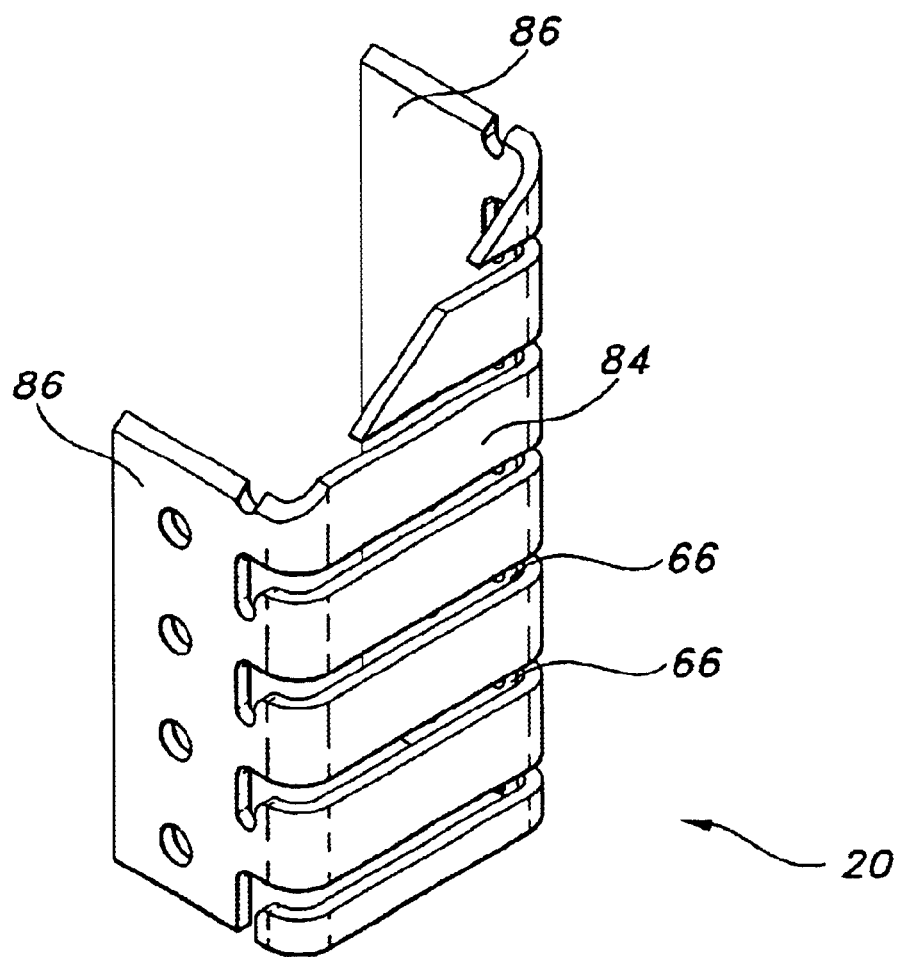
FIG. 12 is a broken isometric view of a portion of the member illustrated in FIG. 11.

Each of upstanding members 20 is equipped with a plurality of identical slots 66 formed therein. Each upstanding member 20 is preferably formed of a U-shaped channel member as illustrated in FIGS. 11 and 12. Slots 66 are formed in the bottom 84 of the channel U-shaped or upstanding member 20 and in the two sides 86 of the U-shaped channel of upstanding member 20.

Figure 4:
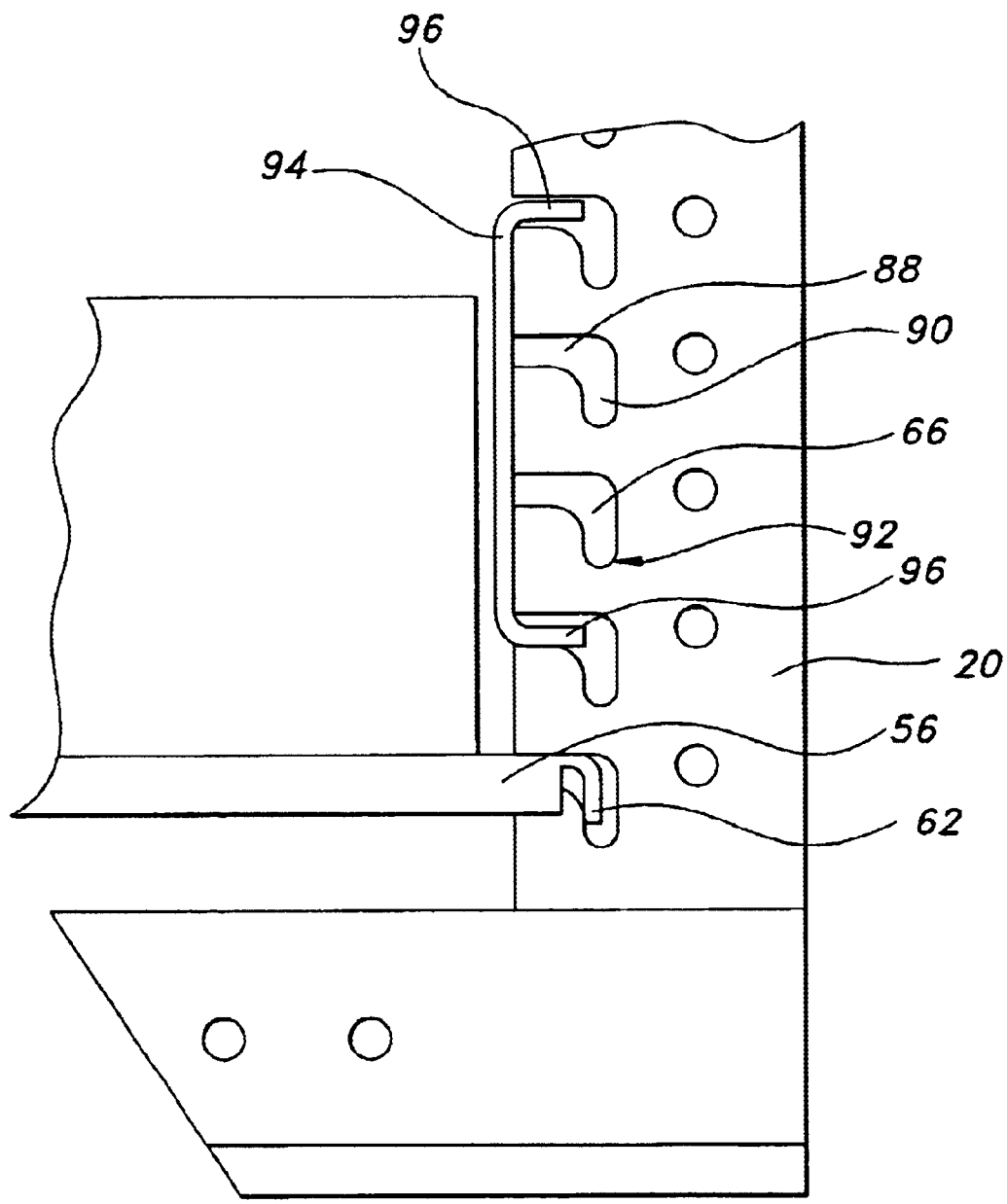
FIG. 4 is an enlarged broken view of a part of the lower front right-hand corner of the system shown in FIG. 3 showing in detail the profile of a cell shelf edge and a horizontal spacer and their relationships to receiving slots in corner posts of the rack.

As best illustrated in FIG. 4, each slot 66 includes a horizontally extending portion 88 which communicates with the exterior surface of the upstanding member 20 in which slot 66 is formed and a vertical portion 90, the extremity of which is remote from horizontal portion 88, defining a closed vertical bottom 92 of slot 66. As illustrated in FIGS. 4, 11 and 12, vertical portions 90 of slot 66 are formed in channel sides 86 of upstanding members 20 while the openings of horizontal portions 88 which communicate with the exterior surface of channel members 20 are formed in channel bottom portions 84; all of this is best illustrated in FIG. 11.

The configuration of slots 66 together with a corresponding configuration of longitudinally extending lips 62 of cell support shelf 56 serves to retain cell support shelf 56 reasonably securely in place within upstanding member 20. This configuration is illustrated in FIG. 4. The edge extremity of longitudinally extending lip 62, which is a vertically downwardly extremity in FIG. 4, preferably stops short of closed bottom 92 of slot 66 in upstanding member 20.

Support shelf 56 further includes a transversely extending lip 64 which serves to limit horizontal travel of support shelf 56 when support shelf 56 is inserted into slots 66 in upstanding members 20 of rack front and rear frames 16, 18 in the manner depicted generally in FIG. 3.

Support shelf 56 further includes a backing member 68 which is positioned at the rear edge of support shelf 56, oppositely from transversely extending lip 64, and extends upwardly relative to the remaining planar portion of support shelf 56. Backing member 68 provides a stop for cells 12 as those cells are inserted into rack 14 in the manner depicted generally in FIG. 3.

Rack front frame 16 is fabricated preferably by welding upper and lower front horizontal members 24, 26 to the vertical extremities of left and right front upstanding members 32, 34. As a result, when fabricated rack front frame 16 is of generally rectangular configuration as evident from FIGS. 1 through 3.

Rack rear frame 18 is constructed similarly, by welding upper and lower rear horizontal members 28, 30 to left and right rear upstanding members 36, 38 and additionally by welding of rear cross braces 40 at the four corners of rack rear frame 18.

Rack 14 is then assembled using four longitudinal members, only three of which are visible in FIGS. 1 through 3 as a result of the isometric form of the drawings. Longitudinal members 70 are preferably bolted to rack front frame 16 and rack rear frame 18 using bolts and nuts which are illustrated schematically in FIG. 3 but which have not been numbered in the drawings. Longitudinal members 70 each preferably include a vertical flange portion 72 which is positioned in a vertical plane as clearly illustrated in FIG. 3 and a horizontal flange portion 74 which is also clearly illustrated in FIG. 3. Extremities of vertical flange portions 72 preferably fit in abutting contact with inwardly facing surfaces of upstanding members 20 where those inwardly facing surfaces form the bottom of the U-shaped channel section or profile of each upstanding member 20. The U-shaped configuration of each upstanding member 20 is particularly evident in FIG. 11. The vertical extremity of each upstanding member 20 is of generally solid, planar configuration and designated generally 86 in FIG. 11; the longitudinal extremities of vertical flange portions 72 of longitudinal members 70 facingly contact planar extremity portions 86 when longitudinal members 70 are bolted into assembly with upstanding members 20.

FIG. 3 shows an exploded view of the system of FIG. 2 wherein cell retaining members 70 and several cell connectors 80 have been removed and some of the shelves 56 and some of the cells 12 and horizontal spacers 82 are shown partially withdrawn from the still assembled rack 14; some cells 12 which rest on the upper two shelves 56 have also been completely removed.

As can be seen in FIGS. 1 through 3, rack 14 preferably consists of a welded front frame 16 and back frame 18. Front frame 16 includes vertically oriented outwardly facing channel members 32 and 34. Connecting the tops and the bottoms of channel members 32 and 34 are angle iron longitudinal members 70 which are welded to the tops and to the bottoms of channel members 32 and 34. Frame rear cross braces 40 are secured to left and right rear upstanding members 36 and 38.

Rack rear frame 18 is similar to rack front frame 16 with rear upstanding members 36 and 38 formed of opposed outwardly facing channels. Similarly, upper and lower rear horizontal members 24, 24 respectively, at the top and bottom of the left and right rear channel upstanding members 36 and 38, are welded in the same manner as rear front frame 16. The slot 66 configurations, described hereafter, are preferably the same in all of upstanding members 20.

Rack 14 is arranged to be assembled in the field. To that end, front and rear frames 16, 18 when assembled are connected together at their corresponding four corners by removable longitudinal members 70, which are conveniently formed of angle iron. The vertical surfaces of longitudinal members 70 are bolted to the channel bottoms of upstanding members of rack frames 16 and 18 across the top and bottom by bolts and nuts or other easily removed connection means. One of longitudinal members 70 and connection thereof is shown in the exploded view of FIG. 3. Desirably, identical bolts and nuts, as well as appropriate washers and/or lock washers, easily connect the rack front and rear frames together via longitudinal members 70 into rack 14. The horizontal surfaces of each of longitudinal members 70 are cut away at the corners to assure clearance of rack frames 16, 18. More than one bolt or other type of coupling may be employed; bolts are preferable as they are easily installed and removed using conventional hand tools. Since rack frames 16 and 18 are preassembled, the system is ready to be assembled in the field using longitudinal members 70. When the rack front and rear frames are attached, the rack 14 is essentially complete. Additional rigidity may be obtained using rear cross brace 40 which also may be bolted into place.

Multiple identical cell support shelves 56 are interchangeable, as well as moveable. The shelves 56 are supported by upstanding members 20. Identical slots 66 are made at the same heights and equal intervals between slots along upstanding member 20 as illustrated in FIG. 4. Each slot 66 is formed in the channel bottom, extends into the channel sidewalls and terminates in a vertically downward extension at the end at the horizontal extent of the slot. The form and structure of the slots 66 is seen more easily in enlarged FIG. 4. Since slots 66 are identical, edges of cell support shelves 56 are curved in a cross sectional profile to conform to slots 66. Slots 66 are made so that they will snugly contain both curved edges of the cell support shelves 56 and yet permit them to slide through slots 66 in the front upstanding members 32, 34 and engage and slide into slots 66 in the rear upstanding members 36, 38. Thus lips 62 of shelves 56 are folded downward to form a vertically downward extending side flange on each side of a shelf 56.

The shelves 56 may also have a lip 64 on the front, which is similar to that on the sides. The back may also be flanged provided that a vertical member 68 does not extend laterally sufficiently to block entrance of lips 62 into slots 66. The nature of lips 62 and 64 is seen in FIG. 13. The cell support shelves 56 are also provided with ventilating apertures 58 which are positioned so as to lie above and below the predetermining spacings of the cells 12 as seen in FIG. 3.

The rack 14 may also be provided with sidewall panels 94 on each side on the inside of rack 14 extending between shelves 56 and slots 66 in members 20 for support. As seen in FIG. 4, sidewall panels 94 have lips 96 which engage selected slots 66 snugly so that the panels 94 are held in position frictionally. Sidewall panels 94 prevent any accidental dropping of cells 12 through the side of rack 14. A cotter pin 98 may also be installed as an additional measure to hold a panel 94 in place. In most cases, panels 94 merely help align the cells 12 as they are put into position and provide another boundary for vertical spacers 100 along the edges of the cells 12 at the end of a row.

Between cells 12 are placed vertically oriented horizontal spacers 100 as seen in FIG. 3. The spacers 100 are preferably provided with open vertical corrugations or vertical chimneys, which extend through the spacers 100 and allow air ventilation to pass through. Spacers 100 may also be placed at the ends of each row of cells 12 between the outside cell 12 and the sidewall panel 94 to hold the row against lateral movement.

Figure 6:
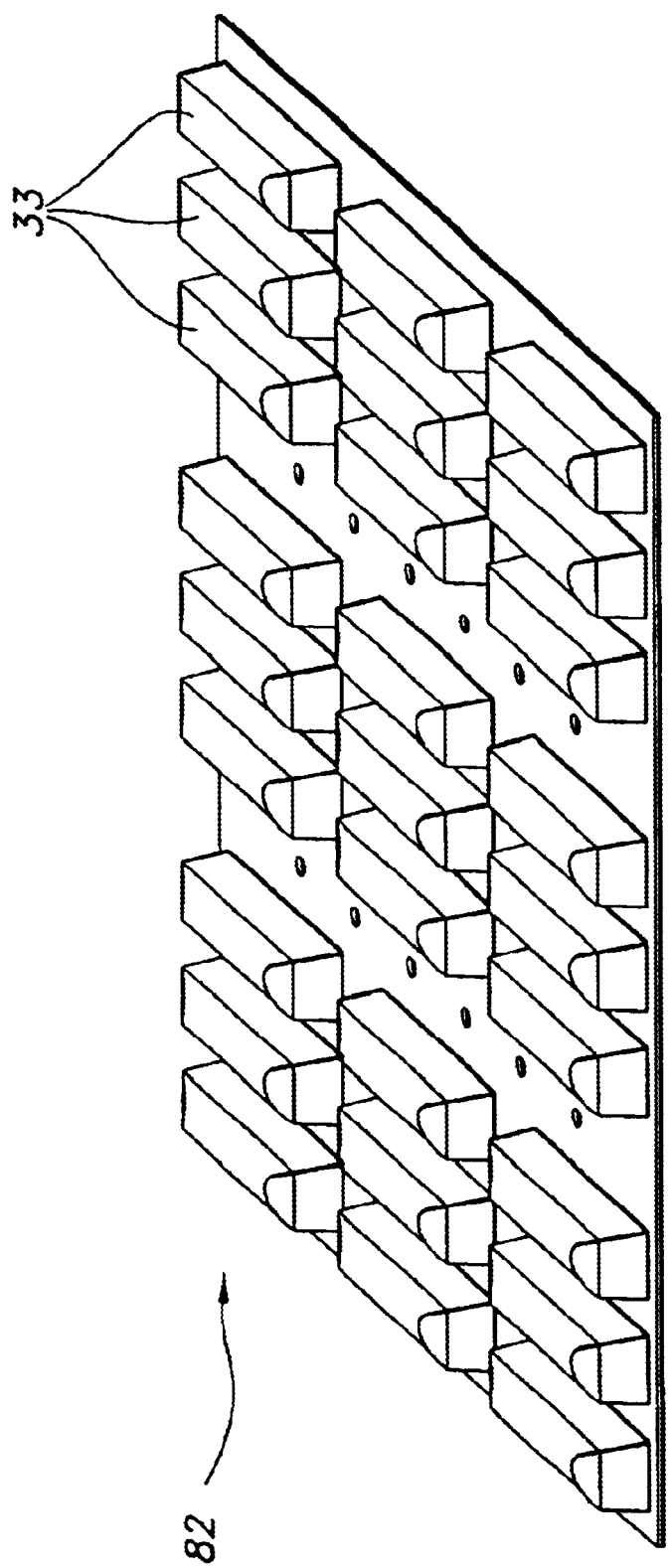
FIG. 6 is an isometric view of a vertical spacer forming a part of the system illustrated in FIGS. 1, 2 and 3.

Horizontally oriented vertical spacers 82 as seen in place in FIGS. 1, 2 and 3, and isolated in FIG. 6, are intended to provide firm resistance to bulging of the cell covers 42 as the plates 46, 48 and covers 42 expand. It is preferable to avoid continuous uniform thickness spacers 100. As seen in FIG. 6, a preferred configuration provides a patterned distribution in rows and columns of protrusions 33 which are hollow, vacuum formed protrusions 33 to a selected profile with variations such as curved upper surfaces. The protrusions 33 are firm but preferably resiliently yieldable to resist but not cause damage to cells 12 under force from the cells 12 so as to avoid any breakage. Alternatively, spacers 82 may additionally have downward extending projections to extend between and act to hold cells 12 separately transversely.

Cells 12 of different sizes may be employed in which event shelves 56 are positioned in appropriate slots 66 to accommodate those cells 12 with room left at the top for horizontal spacers 82. The cells 12 are sized laterally, so that a predetermined number may be placed side-by-side laterally. Once the cells 12 are put in place, cell retaining members 78 for holding the cells 12 on the shelves 56 may be added as best seen in FIG. 3. Cell retaining members 78 are easily attached using bolts and nuts which engage through holes arranged vertically in the upstanding members 20 in order to retain the cells 12 in position. The screws pass through holes in attachment flanges 79 at each end of cell retaining members 78. Retention tabs 77 extend upward from the bar along the length of the bar to retain the cells 12 in position. Attachment flanges 79 serve the purpose of effectively positioning and limiting movement of the cells 12 forward on the shelves 56.

Figure 5:
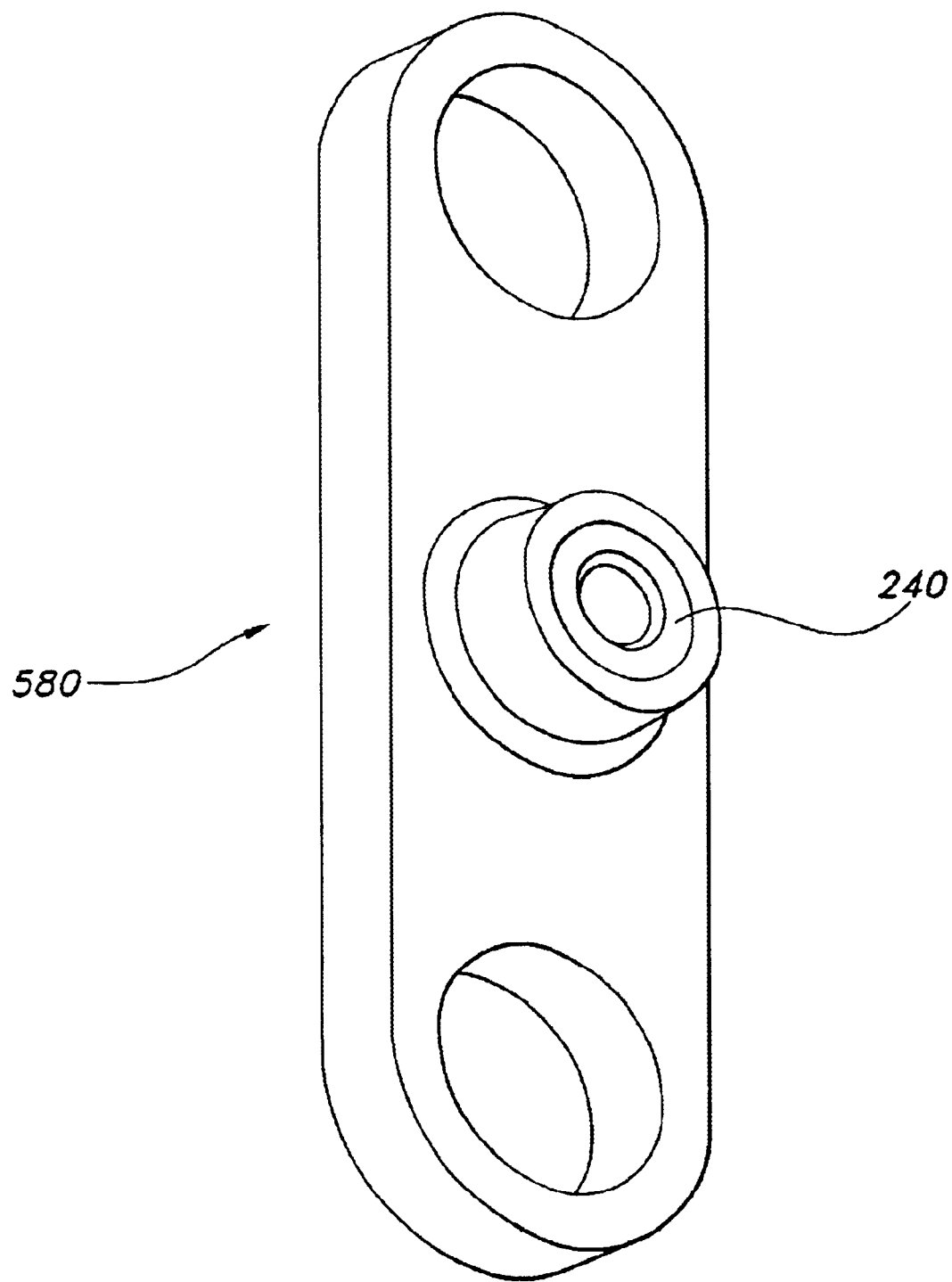
FIG. 5 is an isometric view of a single common polarity terminal connector for one of the cells illustrated in FIG. 1.

A conductive connector 580 preferably of lead for connecting like polarity terminals of a cell 12 is shown alone in FIG. 5. The holes 582 at each end are designed to snugly and conductively engage cell 12 terminal posts 54*a* (FIG. 7) over which they are placed and welded. Each conductive connector 580 is covered by a molded insulator covering 581, allowing its preferably threaded brass terminal connection and connection terminal 240 to protrude. Conductive connectors 580 connect terminal posts 54*a* of the same cell 12 placing them in parallel and providing a single connection terminal 240 to which cell connectors 80 (FIG. 1) of different lengths are connected to connect together the cells as required to meet electrical specifications for a standby unit, all as shown in FIG. 1.

A major advantage provided by the battery system according to the invention results from the horizontal orientation of the cell plates. In a recombinant cell of the type to which this invention pertains, maintenance of good contact between the positive and negative cell plates and the glass mat separator material between the plates is critical since the amount of liquid electrolyte within the cell is essentially completely absorbed within the glass mat separators. If there is not good contact between the plates and the separator material with the electrolyte contained therein, the cell will not function properly.

Batteries according to the invention make use of the weight of the plates to effectuate good plate-separator contact. Accordingly, batteries and cells according to the invention do not require any external pressure maintenance apparatus to maintain compressive force on the cell case thereby to maintain good contact between the cell plates and the separator material. Rather, gravity serves to maintain such good contact. The vertical separator which is positioned above the upper surfaces of the cells and below a cell support shelf which is positioned immediately above a relevant row of cells, is slidably insertable into position prior to operation of the battery system. As the battery system operates, gas may be evolved within the cells, the cell plates may grow as a result of plate corrosion and, accordingly, the cells expand in volume. As the cells expand in volume against the vertical separator positioned between the cells and the cell support shelf which is immediately above a relevant row of cells, the reaction to the force produced as the cell expands produces a compressive force against the cell. Hence, as the battery system operates and the cells expand, force squeezing the plates together in the vertical direction and thereby squeezing the plates against the glass mat separator material between the plates increases thereby insuring continued good operation of the cells. With this arrangement, no vernier means is required to maintain adequate pressure between the positive and negative plates and the glass mat material retained therebetween. This elimination of vernier parts results in a higher reliability battery system at lower cost than known theretofore.

A major advantage afforded by the battery system according to the invention is the ability to provide battery systems of various voltage and amp hour capacities using a single, standardized rack with a single, standardized footprint. For example, the battery system illustrated in FIG. 1 may be used to provide a larger amp hour capacity with higher voltage than the battery system illustrated in FIG. 2 which utilizes smaller cells. In both cases, the rack footprint is the same.

When a battery system according to the invention is installed, initially the rack is assembled by connecting the forward and rear frame portions. Next a cell shelf is inserted into a set of slots at the bottom of the rack. The shelf is inserted into the slots in the frame uprights until the shelf lip meets the front of the frame. Left and right side braces are then inserted into the slots as illustrated in FIG. 3; desirably, the side braces are positioned at approximately the vertical midpoint of the relevant row of cells. The left and right side braces are then preferably secured with a cotter pin to prevent movement. Corrugated vertically oriented, horizontal spacers 100 of the type illustrated in FIGS. 3 and 14 through 17 are then installed between the bracing and the cells and between immediately adjacent cells. After the cells have been installed with the corrugated spacers between them, vertical spacer 82 is installed.

After vertical spacer 82 has been installed, the next cell support shelf is installed and the process repeats.

This invention further embraces in combination with the foregoing an expandable flexible connection between a cell cover and terminal to compensate for expansions of plates or grids and/or gas generator. The expandable design encompasses a flexible case which facilitates movement of the battery terminal. As much as three-quarters of an inch (0.75") of movement or more of the terminal relative to the thermoplastic cell cover can be accommodated; this allows movement of a terminal without compromising the seal between the case and the terminal.

Figure 18:
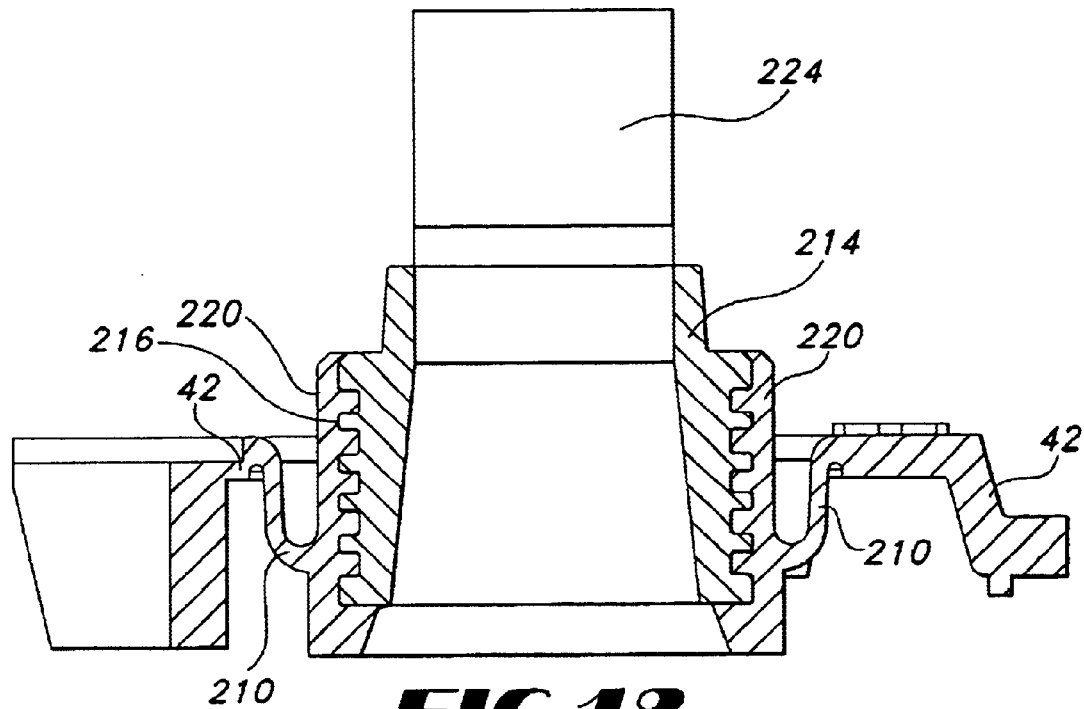
FIG. 18 is a sectional view along the axis of a flexible cell terminal assembly showing in section a cell cover assembly manifesting aspects of the invention.

Referring now to FIG. 18, part of a lead acid cell, generally designated 12, having an expandable cell cover 42 and a lead alloy bushing 214 for receiving a battery terminal, is shown. The case and cell cover 42 are made of a moldable thermoplastic resin, such as polypropylene, and sealed together after assembly. The cell cover 42 includes an integrally molded tubular sleeve 220 extending transversely to the cell cover 42 into an opening for receiving the terminal post. The lead alloy bushing 214, which is connected mechanically and electrically and sealed airtight to a terminal post extension, has successive annular grooves in its outer generally cylindrical surface to facilitate bonding to sleeve 220 as the sleeve is formed in place around the bushing during the molding process. The bushing is preferably incorporated to the mold when the cell cover, including sleeve 220, is formed.

Grooves 216 on the outer cylindrical surface of terminal post extension lead bushing 214 receive molten polypropylene or other thermoplastic material while in the mold so that a good permanent air tight bond is achieved with molded tubular sleeve 220. Bushing 214 may be heated or chemically treated with a suitable bonding agent for improving the seal with sleeve 220. A terminal post for plates of common polarity is welded into the bushing, as is a conductive terminal insert 224 to improve electrical connection to the terminal.

Resilient cell cover wall 42 is molded integrally with a flexible thinner wall connection 210. Connection 210 connects the outside surface of the integrally molded sleeve 220 to the cell cover 42. Flexible connection 210 is annular and generally normal to the tubular sleeve, making an upward turn to a generally coplanar connection to cover 42. Connector 210 is sufficiently thinner than the case to provide a flexible loop. The integral flexible loop is typically formed to have a thickness sufficiently less than that of the case wall to afford flexibility needed to bend as it moves upwardly relative to cell cover 42 while maintaining the seal between bushing 214 and tubular sleeve 220.

Referring now to FIGS. 19, 19A, 19B and 19C, the terminal bushing, cell cover and their connection 210 are shown in successively changing positions as plate expansion progresses. The end of flexible connector 210 attached to the case deforms outwardly relative to the cell in response to plate expansion forces and flexible connector 210 changes shape. As shown, flexibility of connector 210 permits case sleeve 220 to move away from case 42 without destroying continuity provided by the flexible connector loop.

Figure 20:
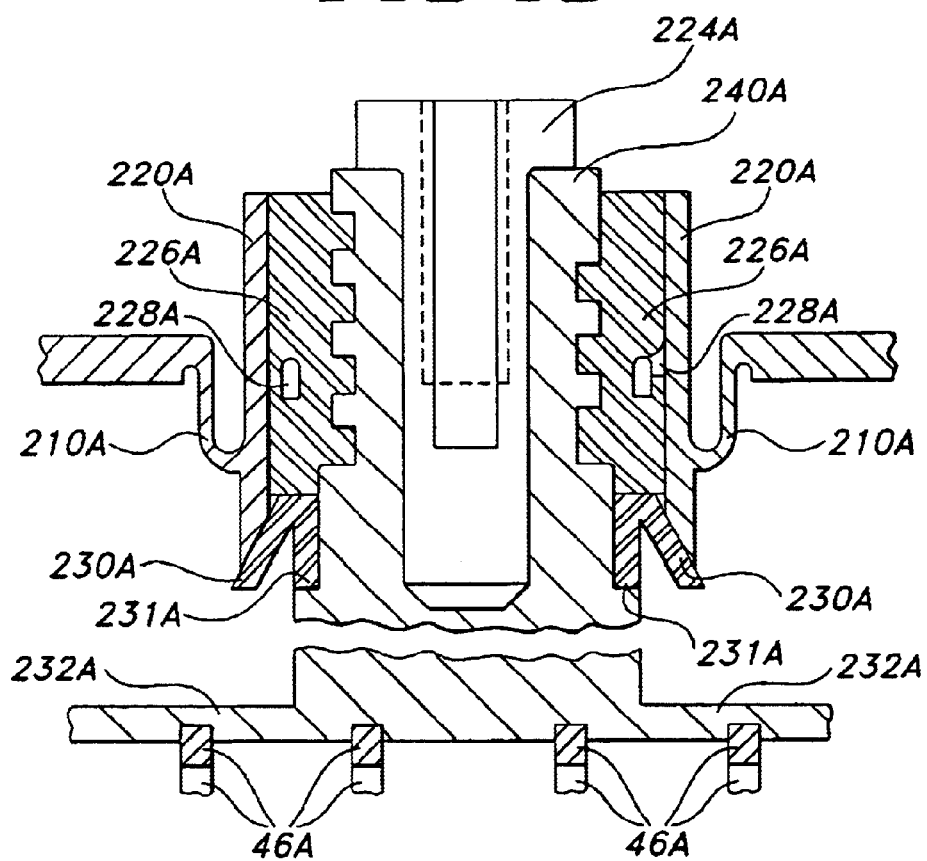
FIG. 20 is a partial sectional view through the axis of the terminal of an alternative embodiment of the flexible terminal case structure similar to that illustrated in FIG. 19.
Figure 19:
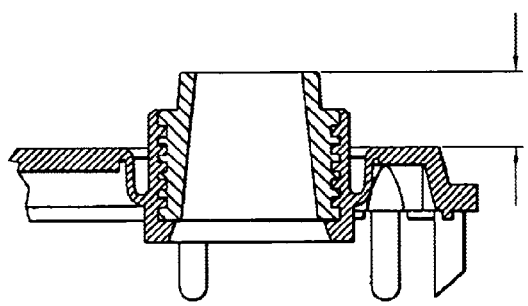
FIGS. 19, 19A, 19B, and 19C are a series of sectional diagrammatic views similar to FIG. 18 illustrating movement of a positive terminal and deformation of the flexible cell cover in accordance with the invention.
Figure 19A:
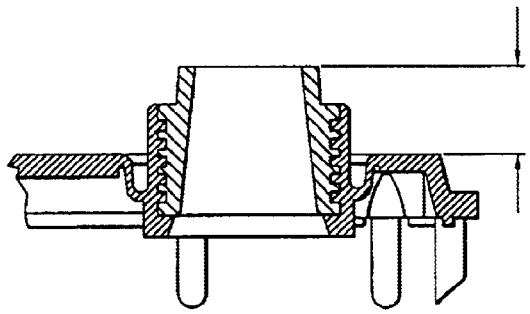
Figure 19B:
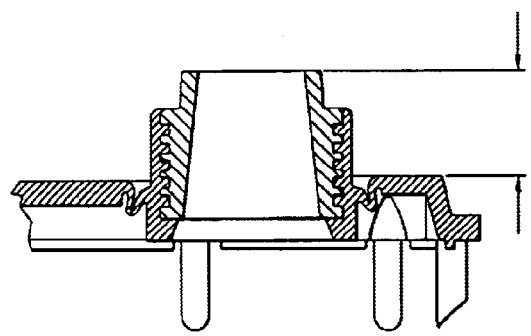
Figure 19C:
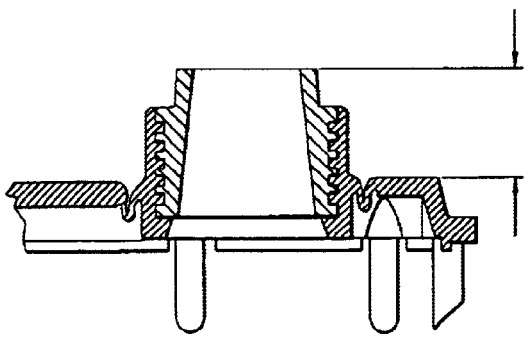
Figure 23:
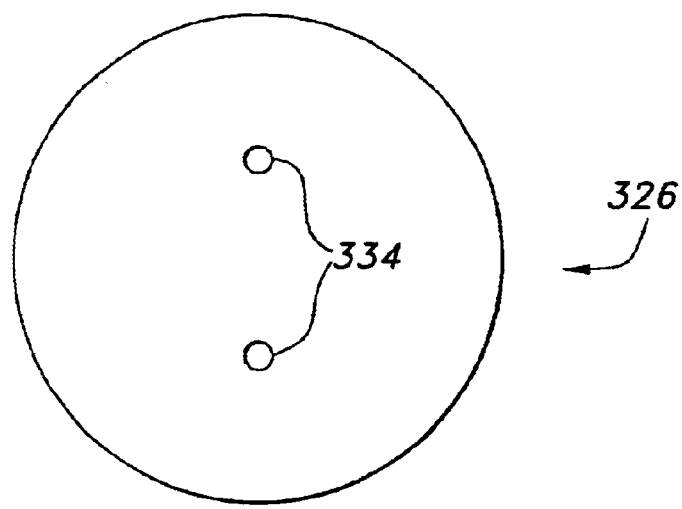
FIG. 23 is a top view of the structure of FIG. 22.
Figure 22:
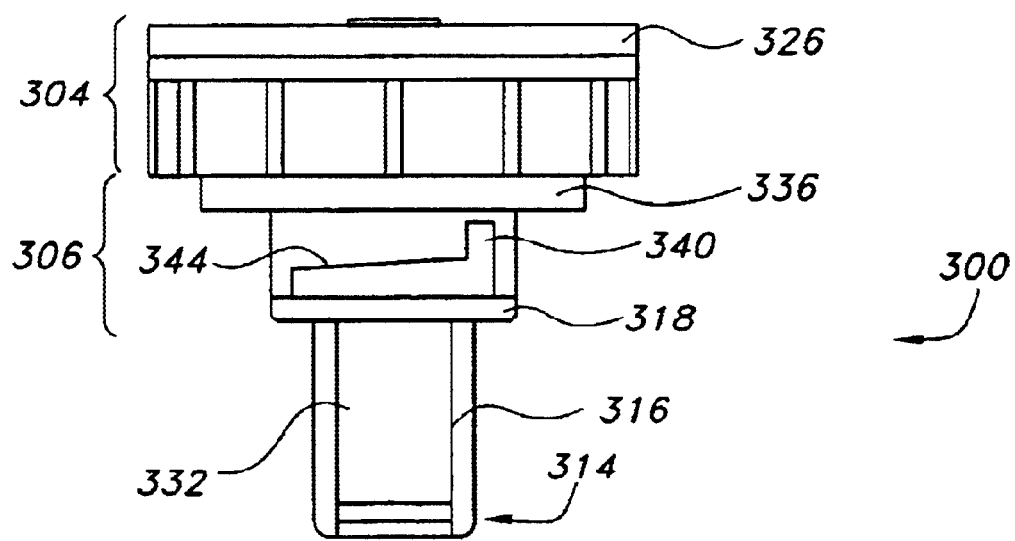
FIG. 22 is a side elevation of a vent valve-catalyst carrier assembly for use in practicing aspects of the invention.

In an alternative embodiment shown in FIG. 20, a uniform thickness tubular sleeve 220 is integrally molded with the cell cover 42 with the flexible connector 210 interconnecting them in generally the same configuration as FIG. 18. Thus corresponding parts are indicated with the same number designator with the letter "A" added in the drawing figure. The lead-alloy terminal post extension 240 is not molded integrally with the cell cover of this embodiment but is shown with a conductive terminal insert 224A welded in place, which insert is provided with a threaded axial bore. An epoxy compound 226A seals post extension 42 to tubular sleeve 220A attached to cell cover 42 by integrally molded flexible connection 210A.

An annular inverted V-section resilient gasket 230 rests on a shoulder 231A of the lead-alloy post extension 240 and resiliently bears against sleeve 220, closing off the bottom of the space therebetween. Consequently, liquid epoxy poured between bushing 214A and the sleeve 220A is retained and hardens into an airtight seal.

An annular lock ring 228A molded integrally with the inside of tubular sleeve 220A and connected thereto by periodically spaced posts 228A is embedded within epoxy 226A to better secure sleeve 220 to post extension 240A. Since the post extension is not molded with the cell cover in this case, as with bushing 214 in FIG. 18, the post extension is assembled to the plates before pouring the epoxy. The post extension 240A which extends well into the battery case below the cell cover 42 as shown broken in FIG. 20.

The post extension is shown assembled with the connector 232A for the plates and the positive plates 46. When the epoxy is poured, not only the post extension but its entire assembly is connected thereby to the cell cover 42.

Still another alternative embodiment is seen in FIGS. 21A and 21B. Much of the basic structure is similar. The connector is designated 210, although it assumes a different form in this embodiment, in that it is effectively an extension of tubular sleeve 220 thinned down to be very flexible to loop inwardly from sleeve 220, instead of outwardly. In this embodiment, the bushing is molded with a thermoplastic ring 236, which, like the tubular sleeve 220, is able to fill the annular grooves around the bushing to ensure a better bonding and airtight connection. The outer surface of ring 236 is a right circular cylinder dimensioned to snugly fit within tubular sleeve 220, and is provided with a shoulder 236*a* which rests atop the tubular sleeve as means for indexing the portions when assembled.

The free end of connector 210 is turned inwardly to provide a generally planar circumferential sealing surface which is in turn sealed to the flat bottom of ring 236 by ultrasonic bonding, for example to ensure an airtight seal between the structures. Hence, an overall airtight battery structure exists after the conductive terminal insert 224 is put in a snugly fitting position within the bushing and welded thereto. Insert 224 in this case is part of connector post 240, providing a common connector for the plates which are connected together and to the terminal post.

As expansion occurs, the plates and connector 240 drive bushing 214 and ring 236 upwardly. Relative movement occurs between tubular sleeve 220 and ring 236; the circumferential connector because of its flexibility is able to move upwardly with the ring to which it is attached so that the connector assumes the loop form as seen in FIG. 21B. Movement can occur up to about three-quarters of an inch (0.75") without rupture of the seal. Thus, it will be seen that in each case a thinner, more flexible connector is provided circumferentially between relatively moving parts. As relative movement occurs the connector 210 changes shape to accommodate the movement, maintaining the seal.

Although the connector assumes different positions in various embodiments and may assume even different positions from those shown, as long as such an extra thin flexible resinous connector is provided between moveable parts, the seal can be maintained through the range of movement normally experienced, particularly at the positive terminal.

A catalyst unit 300, such as one of the combination vent valve-catalyst carrier assemblies illustrated in FIGS. 22 through 35, fits within catalyst unit receptacle formed in cell cover 42 as illustrated in FIG. 7 and is in vapor communication with the cell interior. As a result, hydrogen and oxygen, which evolve from the lead metal plates as the electrochemical reaction proceeds, come into vapor communication with one another and with catalyst material within the catalyst unit 300 and even more efficiently recombine into water or water vapor. The catalyst unit 300 has a catalyst material, preferably palladium, therein and exposes evolved hydrogen and oxygen within cell 12 resulting from the electrochemical reaction to catalyst material within catalyst unit 300. This enhances recombination of hydrogen and oxygen into water or water vapor within cell 12.

In the preferred practice of the invention little or no liquid phase water results from the recombination of hydrogen and oxygen in the presence of the catalyst. This is believed to be due to the high heat of reaction of the recombination process in the presence of the catalyst. The hydrogen and oxygen, when recombining, go directly to vapor phase water, i.e. steam, with the reaction occurring at a temperature in the neighborhood of 400° Fahrenheit.

Water vapor resulting from recombination of the hydrogen and oxygen may initially create a somewhat higher partial pressure of water vapor in the vicinity of the catalyst unit 301.

FIG. 7 depicts in schematic form a catalyst equipped vapor communicating, valve regulated lead-acid cell manifesting aspects of the invention in which the lead-metal plates 46 and 48 and cell plate separators 50 are positioned in horizontal planes. The cell having its lead-metal plates 46 and 48 in a horizontal, sandwiched configuration is designated generally 12 and includes a jar designated generally 44 and a cover designated generally 42. Absorbent glass mat separator material positioned between positive plate 46 and negative plate 48 is designated generally 50.

A catalyst unit is positioned in a vertically oriented side wall or cover of cell 12. The catalyst unit 301 is preferably a combination vent valve-catalyst carrier assembly of one of the types illustrated in FIGS. 22 through 35.

It is not necessary for a vent valve-catalyst carrier assembly 300 to be positioned symmetrically or even at the centers of cell 12.

Referring to FIGS. 22 through 29, a vent valve-catalyst carrier assembly suitable for installation in a recombinant valve regulated lead-acid cell practicing the invention is designated generally 300.

Vent valve-catalyst carrier assembly 300 carries a catalyst material which enhances recombination of hydrogen and oxygen gas produced during the electrolytic reaction within the lead-acid cell. Vent valve-catalyst carrier assembly 300 is positioned to provide pressure relief from within cell 12 to atmosphere upon pressure within cell 12 reaching a predetermined level.

Vent valve-catalyst carrier assembly 300 preferably extends into cell 12 via an apertured vent valve-catalyst carrier assembly receptacle formed in case cover 317. The receptacle preferably includes an integrally molded cylindrical collar 341. Vent valve-catalyst carrier assembly 300, when in place within the receptacle, vents gas from inside cell 12 when pressure exceeds a predetermined level. A catalyst carrying plug 332 is supported at the end of the vent valve-catalyst carrier assembly 300 which is inside cell 12 and promotes recombination of hydrogen and oxygen to minimize water loss from cell 12.

Vent valve-catalyst carrier assembly 300 includes a preferably injection molded body 302 having upper and lower cylindrical portions with the upper portion denoted 304 and being of larger diameter and the lower portion denoted 306 and being of smaller diameter. Upper and low cylindrical body portions are connected by an annular web 308. Extending across the open interior at the upper end of lower cylindrical body portion 306 is a valve seating web designated generally 310 in which a valve stem member 312 is retained.

Extending downwardly from the cylindrical interior of lower cylindrical body portion 306 is a cage designated generally 314.

Figure 26:
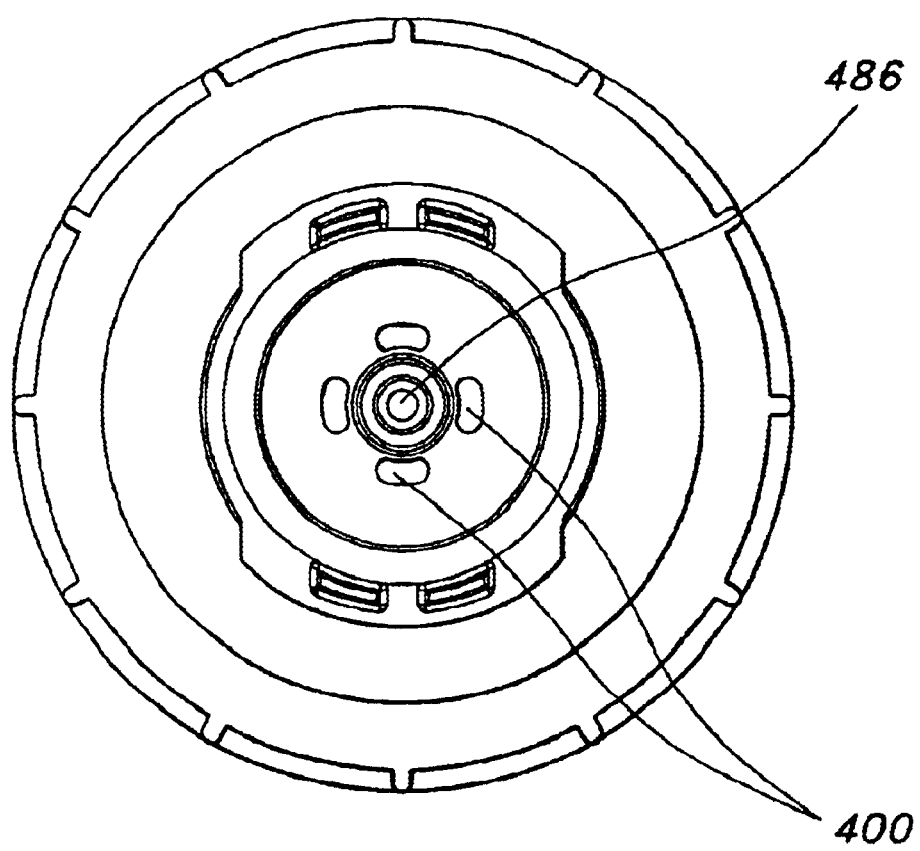
FIG. 26 is a bottom view of the structure of FIG. 25, with the catalyst carrier and supporting structure removed, looking in the direction opposite that of arrows F—F in FIG. 24.

Slidably retained within cage 314 is a catalyst carrying plug 332 within which are particles or granules of catalyst material designated C in FIG. 26.

Figure 27:
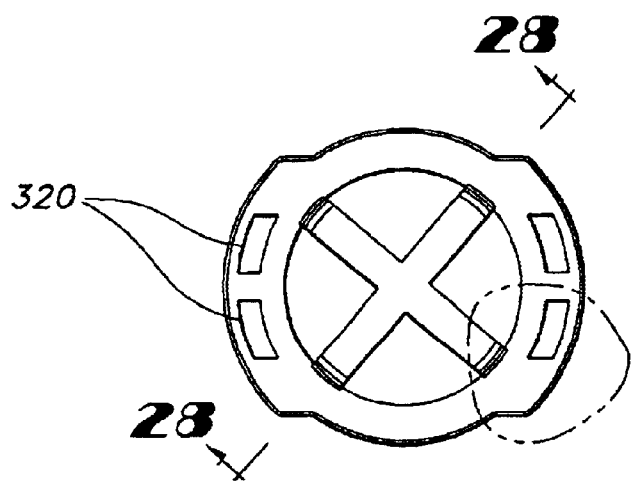
FIG. 27 is an enlarged top view of the catalyst carrier and support structure separated from the vent valve assembly of FIGS. 22 through 26, looking in the direction of arrows F—F in FIG. 24.
Figure 29:
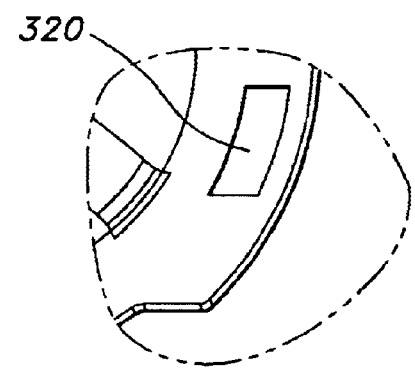
FIG. 29 is an enlarged partial view of the structure shown within dot and dash line H—H in the lower right portion of FIG. 27.

Cage 314 includes axially elongated rail members 316 and an annular outer ring portion 318 in which are formed apertures 320, best seen in FIGS. 27 and 29, which receive downwardly extending nibs 322 which are integral with and formed as a part of lower cylindrical body portion 306.

Extremities of rail members 316 at the lower end of cage 314 curve radially inwardly to join one another and form a cross configuration at the bottom of cage 314. These lower extremities of rail members 316 are designated generally 324 in FIG. 25 and form the cross illustrated in FIG. 25.

An annular interior shoulder 333 formed in the inner surface of upper cylindrical body portion 304 proximate the top end thereof is shown in FIG. 24 and provides a shoulder for support of a porous disk 328 which is preferably formed of porous polyethylene to block flames or sparks from passing through the vent valve portion of the vent valve-catalyst carrier assembly 300. A vent valve-catalyst carrier assembly cover 326 covers the axially facing exterior of upper cylindrical body portion 304 and preferably frictionally couples to upper cylindrical body portion 304 via vent valve cover tabs 330 which are positioned to fit snugly within the cylindrical open interior of upper cylindrical body portion 304 proximate the upper extremity thereof. Vent valve-catalyst carrier assembly cover 326 includes apertures 334 through which gas may pass. Preferably the unitary piece which includes upper cylindrical body portion 304, lower cylindrical body portion 306 and annular web 308 is molded polypropylene.

In FIG. 24 an O-ring is depicted around the cylindrical exterior of lower cylindrical body portion 306 proximate to juncture of lower cylindrical body portion 306 and annular web 308. O-ring 336 provides a gas-tight seal between vent valve-catalyst carrier assembly 300 and body cover 317 when vent valve-catalyst carrier assembly 300 is in place.

Figure 25:
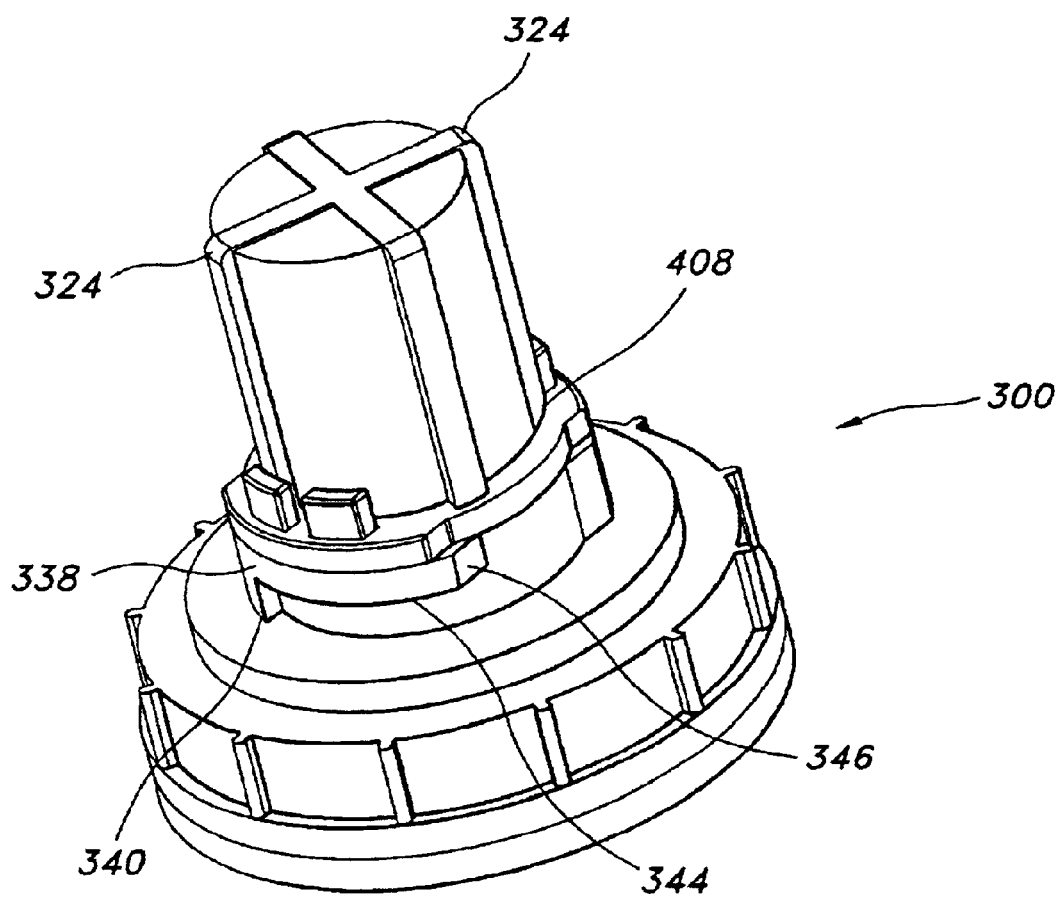
FIG. 25 is an inverted perspective view of the vent valve-catalyst carrier assembly illustrated in FIGS. 22 through 24.

Formed about the lower annular exterior of lower cylindrical body portion 306 are at least a pair of angularly tapered camming shoulders 338. These camming shoulders 338 taper in an angular direction as illustrated in FIG. 25, growing in size in the radial direction with angular travel about the circular outer periphery of lower cylindrical body portion 306. The portions of angularly tapered camming shoulders 338 illustrated in FIG. 24 are the shoulder portions of maximum radial thickness. As illustrated in FIG. 26, these portions taper down with angular position in a counter-clockwise direction in FIG. 24, to a position of tangency with the cylindrical outer surface of lower cylindrical body portion 306.

At the position of maximum radial thickness, angularly tapering camming shoulders 338 include radially extending (upwardly in FIG. 24, but downwardly in FIG. 25) camming blocks 340. Radially extending camming blocks 340 are adapted for camming contact with corresponding opposed camming blocks 342 which are preferably molded in place within a cylindrical passageway formed in cover 317 which receives vent valve-catalyst carrier assembly 300. The radially facing (upper in FIG. 24, lower in FIG. 25) surfaces of radially extending camming blocks 340 are movable camming surfaces 344 cooperating with complementally shaped downwardly facing camming surfaces 346 formed on camming blocks 348 which are preferably molded in place within the cylindrical interior of receptacle 326 in cover 316 within which vent valve-catalyst carrier assembly 300 fits.

As seen in FIG. 24, catalyst carrying plug 332 is preferably sealed at one end by epoxy 392. Catalyst carrying plug 332 is gas permeable for the catalyst to aid in recombination of hydrogen and oxygen within cell 12 to ensure cell 12 does not prematurely fail due to water loss.

Cage 314 and catalyst carrying plug 332 are preferably located along a gas flow path within cell 12. Catalyst carrying plug 332 preferably has an axial dimension less than length of cage 314 such that catalyst carrying plug 332 can move axially for free gas flow about catalyst carrying plug 332. The radial dimension of catalyst carrying plug 332 is selected so that plug 332 may slidably contact the rail members of cylindrical cage 314.

Valve openings 400 shown in FIG. 26 permit gas flow through vent valve-catalyst cover assembly 300.

Valve member 456 illustrated in FIG. 24 is preferably a flexible inverted mushroom-shaped member 456, preferably made of rubber, having a cap 402 and a valve stem 312 extending through valve aperture 486. When valve stem 312 is snugly received in valve aperture 486 in web 310, peripheral edge 402a of valve member 456 covering valve openings 400 rests on valve seating web 310, in sealing contact with web 310 in the valve closed position illustrated in FIG. 24. In this position, valve member 456 seals valve openings 400 closed. Valve member 456 is secured in position by engagement of a narrow waist portion 404a beneath aperture 486 in valve seating web 310 as shown in FIG. 26 which resists upward motion of valve member 456. Downward movement of valve member 456 is precluded by cap 402 which has a radial dimension much greater than valve aperture 486.

If pressure builds within the cell case 41, gas may pass between rail members 316 and into the open interior 408 of lower generally cylindrical portion 306, to exert force on the underside of mushroom-shaped cap 402 to unseat mushroom-shaped cap 402 from valve seating web 310.

Open interior 408 of lower cylindrical body portion 306 for gas flow therein is shown in FIG. 25. The specific actuation properties of the valve to facilitate pressure relief are determined by choice of the rubber utilized to manufacture mushroom-shaped cap 402. For example, a rubber durometer valve of 50 yields a differential pop-off pressure of 0.5 to 5.0 psi. As pressure rises above the selected threshold, mushroom-shaped cap 402 unseats, permitting gas flow upwardly through valve openings 400.

Figure 31:
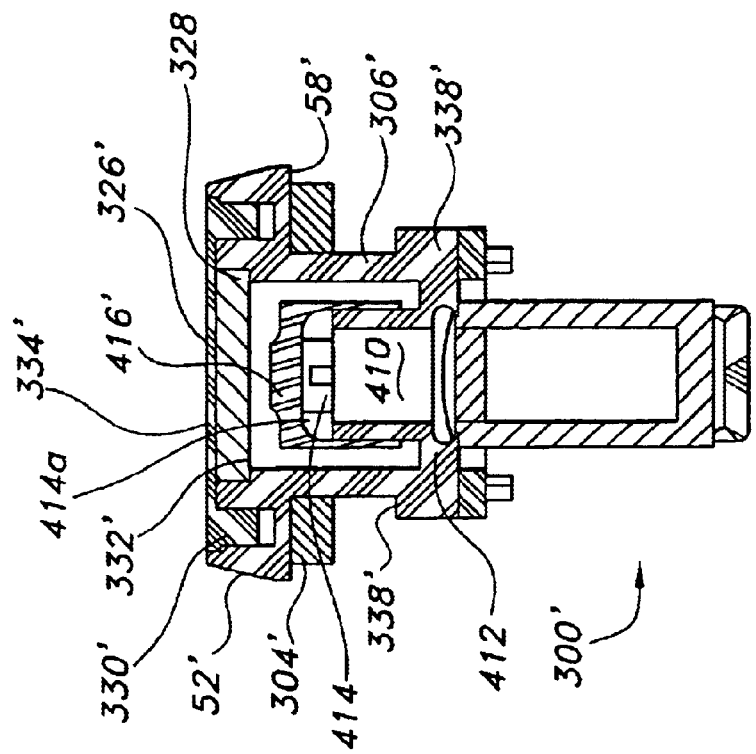
FIG. 31 is an axial vertical section of the structure of FIG. 1.
Figure 30:
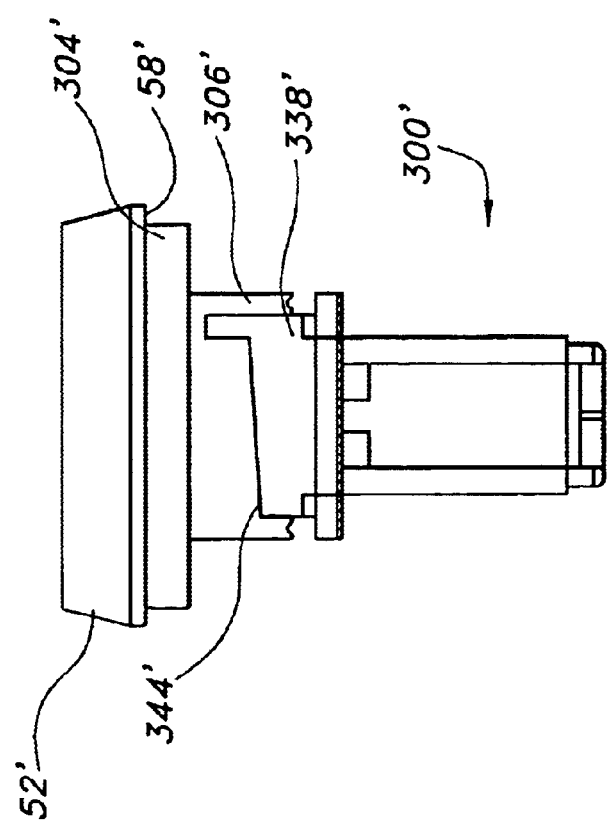
FIG. 30 is a side elevation of another vent valve-catalyst carrier assembly which is a modification of the structure illustrated in FIGS. 22 through 29.
Figure 34:
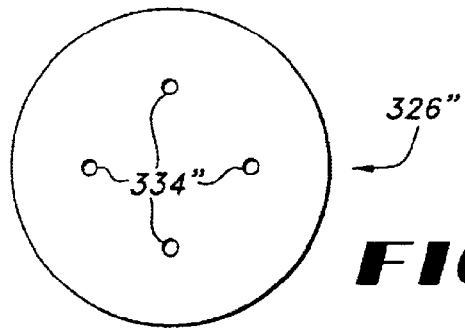
FIG. 34 is a top view of the structure of FIGS. 32 and 33.
Figure 32:
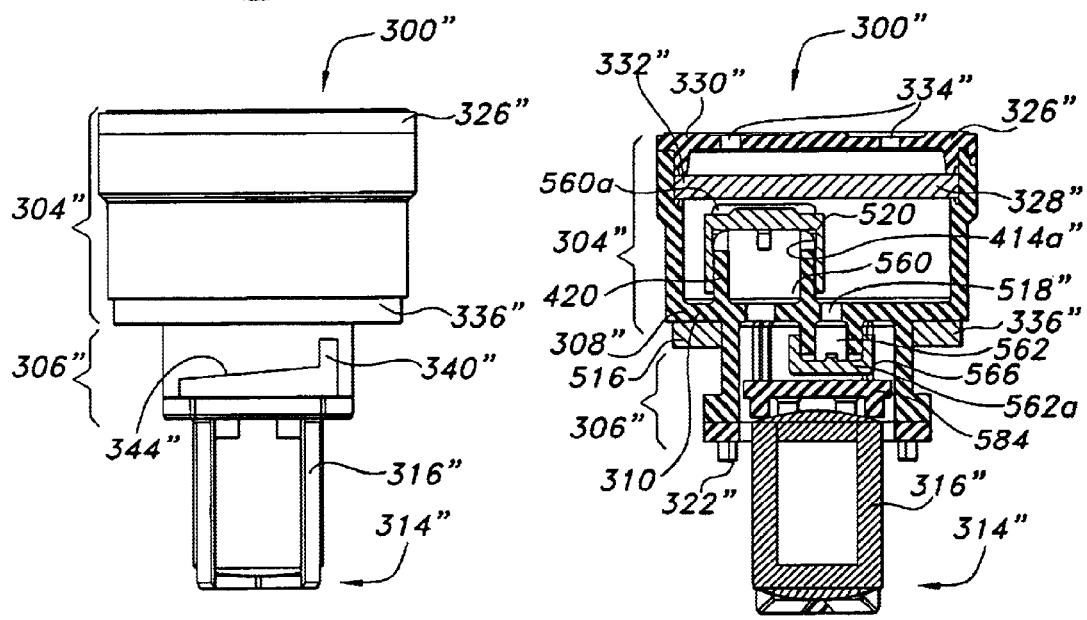
FIG. 32 is a side elevational view of another battery vent valve-catalyst carrier assembly manifesting aspects of the invention.

FIGS. 30 and 31 show a vent valve-catalyst carrier combination 300 employing a different valve construction but embodying broad structural features of the vent valve-catalyst cover assembly 300 shown in FIGS. 22 through 26. Since the structures are similar in many ways, corresponding parts have been given similar number designations with the addition of primes thereto.

In vent valve-catalyst cover assembly 300' illustrated in FIGS. 30 and 31, lower cylindrical body portion 306', which fits into receptacle 326' in cover 16 similarly to body portion 306' shown in FIG. 24, has angularly tapered camming shoulders 338'. The upper surfaces of those shoulders provide movable camming surfaces 344' which cooperate with cam surfaces similar to those of angularly tapered camming shoulders 338' in FIG. 24 on lower cylindrical body portion 306'. Upper cylindrical body portion 304' does not serve as part of the vent body. Instead, upper cylindrical body portion sidewall 332' is connected to lower cylindrical body portion 306' by upper cylindrical body portion web 308' through which lower cylindrical body portion 306' extends, almost to the top of the upper cylindrical body portion sidewall 332'. Thus an annular groove is formed to receive vent valve cover tabs 330' which are near the edge of vent valve-catalyst carrier assembly cover 326'.

Vent valve-catalyst carrier assembly cover 326' is flush with the top edge of the upper cylindrical body portion sidewall 332' so that not only is gas flow confined within lower cylindrical body portion 306', but a different appearance results. The valve is wholly within the lower cylindrical body portion 306' so that the vent channel is through an integrally molded barrier across the bottom of the lower cylindrical body portion 306'. Again, a porous fire wall is provided by porous disk 328' which rests on annular interior shoulder 332' at the top of lower cylindrical body portion 306'.

Figure 28:
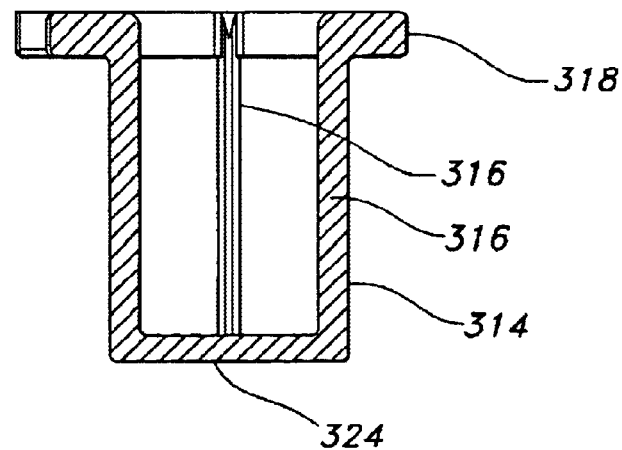
FIG. 28 is a sectional view taken along lines G—G in FIG. 27.

The outside profile seen in FIG. 30 is essentially the same as that of the structure of FIGS. 22 through 26 and the insertion into receptacle 326' of battery cover 317 and coupling to the collar 342 is the same as described in connection with FIGS. 22 through 29. Furthermore, the catalyst container may be the same with the same catalyst material sealed therein with epoxy in the same way and supported in the same structure, all as shown in FIGS. 27 through 29.

In FIGS. 30 and 31 the valve structure includes an axially oriented cylindrical tubular member 410 preferably molded of the same resinous material as the rest of the valve body to which it is connected by a barrier annular web 412 which extends inward from and lies flush with the bottom of lower cylindrical body portion 306'. At the top of cylindrical tubular member 410 is an integral ring 414 having radial slots 414a therethrough the ring. Covering the cylinder and integral ring 414 is an inverted cup 416 preferably made of rubber, a rubber-like material or some other material having similar elastic resilient properties and good frictional adherence to cylindrical tubular member 410 and integral ring 414 which it surrounds.

Increase of pressure inside the battery to a predetermined amount above atmospheric moves the flexible, stretchable sidewalls of inverted cup 416 away from the outside of the cylindrical tubular member 410 and integral ring 414 so that gas may pass through slots 414a, down past the sidewalls of inverted cup 416, up through porous disk 328', and out through apertures 334' of the vent valve-catalyst carrier assembly cover 326'. The durometer range for inverted cup 416 is essentially the same as for valve member 456.

Referring to FIGS. 32 through 35, another embodiment of a vent valve-catalyst carrier assembly suitable for installation in a cell practicing the invention is designated generally 300". Vent valve-catalyst carrier assembly 300" includes a preferably injection molded body 302" having upper and lower cylindrical portions, with the upper portion denoted 304" and being of larger diameter and the lower portion denoted 306" and being of smaller diameter. Upper and lower cylindrical body portions are connected by an annular shoulder 308". Extending across the open interior at the upper end of lower cylindrical body portion 306" as an extension of shoulder 308" is a valve seating web designated generally 310".

Extending downwardly from the cylindrical interior of lower cylindrical body portion 306" is a cage designated generally 314".

Slidably retained within cage 314" is a catalyst carrying plug 32 within which is the catalyst material.

Cage 314" includes axially elongated rail members 316" and an annular outer ring portion 318" in which are formed apertures 320", similar to those illustrated in FIGS. 27 and 29, receiving downwardly extending nibs 322" which are integral with and formed as a part of lower cylindrical body portion 306".

Figure 33:
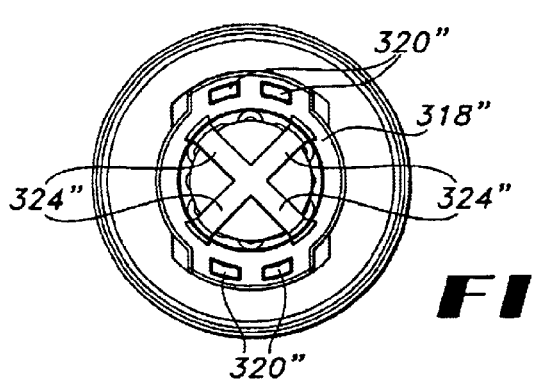
FIG. 33 is a bottom view of the structure of FIG. 32.

Extremities of rail members 316" at the lower end of cage 314" turn radially inwardly to join one another and form a cross configuration at the bottom of cage 314". These lower extremities of rail members 316" are designated generally 324" in FIG. 34 and form a cross as illustrated in FIG. 33.

Figure 35:
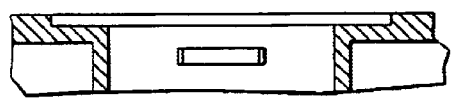
FIG. 35 is a sectional view taken along line N—N of FIG. 32, of the vent valve-catalyst carrier assembly together with a broken sectional view of a portion of a case cover.

An annular interior shoulder 332" formed in the inner surface of upper cylindrical body portion 304" proximate the top end thereof is shown in FIG. 35 and provides a shoulder for support of a porous disk 328" which is preferably formed of porous polyethylene and serves to block flames or sparks from passing through the vent valve portion of the vent valve-catalyst carrier assembly 300". A vent valve-catalyst carrier assembly cover 326" covers the axially facing exterior of upper cylindrical body portion 304" and preferably frictionally couples to upper cylindrical body portion 304" via vent valve cover tabs 330" which fit snugly within cylindrical interior of upper cylindrical body portion 304" proximate the upper extremity thereof. Vent valve-catalyst carrier assembly cover 326" includes apertures 334" through which gas may pass. Preferably the unitary piece which includes upper cylindrical body portion 304", lower cylindrical body portion 306" and annular shoulder 308" is molded polypropylene.

In FIG. 35 an O-ring 336" is depicted around the cylindrical exterior of lower cylindrical body portion 306" proximate to juncture of lower cylindrical body portion 306" and annular shoulder 308". O-ring 336" provides a gas-tight seal between vent valve-catalyst cover assembly 300" and battery cover 16 when vent valve-catalyst cover assembly 300" is in place.

Formed about the lower annular exterior of lower cylindrical body portion 306" are at least a pair of angularly tapered camming shoulders. These camming shoulders taper in an angular direction growing in size in the radial direction with angular travel about the circular outer periphery of lower cylindrical body portion 306". These shoulders taper with angular position in a counter-clockwise direction to a position of tangency with the cylindrical outer surface of lower cylindrical body portion 306".

At the position of maximum radial thickness, angularly tapering camming shoulders include radially extending camming blocks 340". Radially extending camming blocks 340" are adapted for camming contact with corresponding opposed camming blocks which are preferably molded in place within the cylindrical passageway of receptacle 326 formed in cell cover 42 which receives vent valve-catalyst carrier assembly 300". The radially facing surfaces of radially extending camming blocks 340" are movable camming surfaces 344" which cooperate with complementally shaped downwardly facing camming surfaces formed on the camming blocks which are preferably molded in place within the cylindrical passageway of receptacle 326 in cover 316, within which vent valve-catalyst carrier assembly 300" fits, in the manner described above with respect to camming shoulder 338' and FIGS. 24 and 25.

As seen in FIG. 35, catalyst carrying plug 332 is preferably sealed at one end by epoxy. Catalyst carrying plug 332" is gas permeable for the catalyst to aid in recombination of hydrogen and oxygen within cell 12.

Cage 314" and catalyst carrying plug 332" are preferably located along a gas flow path within cell 12. Catalyst carrying plug 332 preferably has an axial dimension less than length of cage 314" such that catalyst carrying plug 332" can move axially and there is free gas flow about catalyst carrying plug 332". The radial dimension of catalyst carrying plug 332" is selected so that plug 332" may slidably contact the rail numbers of cylindrical cage 314".

Valve seating web 310" is molded integrally as an extension of annular shoulder 308". Valve seating web 310" includes at least one pressure relief aperture 516 and at least one vacuum relief aperture 518. Surrounding aperture 516 is an outwardly projecting cylindrical nozzle 560 integrally molded with and supported on seating web 310". Nozzle 560 has lateral vent slots 560a at its edge remote from shoulder 308".

Surrounding aperture 518 is an inwardly projecting cylindrical nozzle 562 integrally molded with seating web 310". Nozzle 562 has lateral vent slots 562a at its inner edge remote from shoulder 308". Slots 560a and 562a give their respective nozzles a castellated appearance. Alternatively, vent holes may be provided through nozzles 560 and 562 near their ends remote from shoulder 308".

Covering nozzle 560 is snugly fitting resilient cup 520, made of rubber or other elastic material, whose side walls snugly engage those of nozzle 560. A cup 566 is similar to cup 520 and is similarly secured to nozzle 562 by frictionally engaging overlying sidewalls.

Operation of nozzle-cup combinations 560, 520 and 562, 566 is dependent upon internal gas pressures which overcome the resilient forces holding the cup sidewalls to the nozzle sidewalls to permit gas to escape or enter at the lip of the cup between the side walls of the cup and the nozzle walls. Upward movement of cup 520, if it would occur at all, is limited to the spacing between nozzle 560 and porous disk 328", which distance is shorter than the length of the cup sidewalls. In addition to functioning as a stop or limiting barrier, porous disk 328" also acts as a fire barrier.

The elastic force of cup 520 on nozzle 560 tends to hold cup 520 in place. As pressure builds within the battery case, the gas exerts a force laterally upon cup 520 sidewalls through vents 560a. After pressure exceeds a predetermined threshold, cup 520 sidewalls unseat from nozzle 560 sidewalls sufficiently to discharge gas from the battery case to atmosphere external of the cell through cup walls 520 up through porous disk 328" and vents 334" in cover 326". Cup 520 is retained in position by sidewall contact friction with the nozzle. Should cup 520 unseat, however, porous disk 328" acting as limiting means will prevent sufficient movement to bring the end of cup 520 sidewalls above vents 560a.

Porous disk 328" is supported on shoulder 332" molded into sidewall of upper cylindrical body portion 304" and held in place by vent valve cover tabs 330" frictionally engaged on the inner wall of upper cylindrical body portion 304".

Operation of cup 566 relative to nozzle 562 is essentially the same but reversed in direction since it is a partial vacuum inside the battery case which causes the action. The higher atmospheric pressure which extends inside upper cylindrical body portion 304" and moves the sidewalls of cup 566 away from nozzle 562. Higher pressure atmospheric air then flows through the space created by deflection of the cup walls to increase pressure within the battery. Should there be a tendency for cup 566 to displace axially from nozzle 562, movement of cup 566 much less than required to move the lip of the cup as far as the nozzle vents 562a will be prevented by porous wall 584. Wall 584 is supported by an integral ring structure carried by rails 316".

Actuation of either cup 520 or 566 to facilitate pressure release is dictated by the properties of the rubber utilized to manufacture the cup and the elastic release force along the nozzle surface. For example, a rubber composition having a durometer valve of 50 yields a release pressure of 0.5 to 5.0 p.s.i. As pressure rises above the durometer-controlled threshold, the cup sidewalls unseat, discharging gas between those walls and the walls of its supporting nozzle.

The catalyst carrying plug may be a porous ceramic. One suitable ceramic material for catalyst carrying plug 332 is marketed by the General Electric Company under the trademark Raton. Additional suitable materials are metal lattices and other sufficiently porous materials which are inactive or inert with respect to the catalyst and can survive the acidic vapor environment within a lead-acid battery.

What is claimed is:

1. A battery including a plurality of lead-acid cells each cell comprising:

a cell case;

a plurality of horizontal positive and negative sandwiched lead metal plates contained within said case;

a header interconnecting said plates of like polarity having terminal posts exposed externally of said case; and a conductive connector having a conductive body interconnecting said terminal posts of header, said conductive connector having a central output terminal for permitting conductive connection to an adjacent cell and an insulated cover overlying said conductive body with said central output terminal being outwardly exposed of said insulated cover.

2. A battery of claim 1 wherein said conductive connector includes an elongate member having a pair of spaced apart openings for positioning over said terminal posts.

3. A battery of claim 2 wherein said central output terminal is threaded.

4. A battery of claim 1 wherein at least a portion of said output terminal is formed of brass.

5. A battery of claim 1 wherein said insulated cover is molded.

6. A battery of claim 5 wherein said central output terminal is outwardly exposed from said molded cover.

7. A battery of claim 2 wherein said openings are sized to snugly engage said terminal posts.

8. A battery of claim 7 wherein said conductive connector is adapted to be welded to said terminal posts.

* * * * *